(12) United States Patent
Zhang et al.

(10) Patent No.: US 12,499,054 B2
(45) Date of Patent: Dec. 16, 2025

(54) SYSTEMS, METHODS, AND APPARATUS FOR ACCESSING DATA IN VERSIONS OF MEMORY PAGES

(71) Applicant: Samsung Electronics Co., Ltd., Suwon-si (KR)

(72) Inventors: Da Zhang, Blacksburg, VA (US); Jing Yang, San Jose, CA (US); Tong Zhang, Mountain View, CA (US); Shuyi Pei, Santa Clara, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 107 days.

(21) Appl. No.: 17/986,889

(22) Filed: Nov. 14, 2022

(65) Prior Publication Data

US 2024/0061786 A1    Feb. 22, 2024

Related U.S. Application Data

(60) Provisional application No. 63/400,041, filed on Aug. 22, 2022.

(51) Int. Cl.
G06F 12/0891    (2016.01)
G06F 12/0804    (2016.01)

(52) U.S. Cl.
CPC ...... *G06F 12/0891* (2013.01); *G06F 12/0804* (2013.01); *G06F 2212/1024* (2013.01)

(58) Field of Classification Search
CPC ............ G06F 12/0891; G06F 12/0804; G06F 2212/1024; G06F 12/0638;

(Continued)

(56) References Cited

U.S. PATENT DOCUMENTS 8,296,498 B2    10/2012    Gorobets et al.
8,364,886 B2    1/2013    Goss
(Continued)

FOREIGN PATENT DOCUMENTS

AU    6949600 A    3/2001
CN    113590502 A    11/2021
(Continued)

OTHER PUBLICATIONS

Abulila, Ahmed et al., "Flatflash: Exploiting the Byte-Accessibility of SSDs Within a Unified Memory-Storage Hierarchy," Proceedings of the Twenty-Fourth International Conference on Architectural Support for Programming anguages and Operating Systems, Apr. 2019, pp. 971-985.

*Primary Examiner* — Nanci N Wong
(74) *Attorney, Agent, or Firm* — Renaissance IP Law Group LLP

(57) ABSTRACT

An apparatus may include at least one memory, and at least one processor configured to determine an accessibility of a first version of a page, wherein the first version of the page may be stored in the at least one memory, and perform, based on the accessibility of the first version of the page, an access of at least a portion of a second version of the page, wherein the second version of the page is stored in the at least one memory. The accessibility of the first version of the page may be based on an erase operation of the first version of the page. The access of the at least a portion of the second version of the page may include an access of a cache line of the second version of the page.

20 Claims, 16 Drawing Sheets

(58) Field of Classification Search
CPC ..... G06F 2212/1016; G06F 2212/7209; G06F 12/0246; G06F 12/1009; G06F 3/064; G06F 3/0658; G06F 3/0659; G06F 12/0292; G06F 2212/7201
See application file for complete search history.

(56) References Cited

U.S. PATENT DOCUMENTS

| | | | |
|---|---|---|---|
| 8,464,095 B1* | 6/2013 | Bonwick | G06F 11/1088 |
| | | | 714/6.2 |
| 8,504,798 B2 | 8/2013 | Conley et al. | |
| 10,635,609 B2 | 4/2020 | Olarig et al. | |
| 2005/0141313 A1 | 6/2005 | Gorobets et al. | |
| 2013/0019057 A1* | 1/2013 | Stephens | G06F 3/0688 |
| | | | 711/E12.008 |
| 2014/0143474 A1* | 5/2014 | Damle | G06F 12/0246 |
| | | | 711/103 |
| 2015/0212937 A1 | 7/2015 | Stephens | |
| 2016/0314161 A1 | 10/2016 | Wen et al. | |
| 2017/0286297 A1* | 10/2017 | Voigt | G06F 12/0238 |
| 2021/0124532 A1* | 4/2021 | Shabi | G06F 3/0608 |
| 2021/0157723 A1 | 5/2021 | Byun | |
| 2021/0182208 A1* | 6/2021 | Palmer | G06F 12/1491 |
| 2021/0303522 A1 | 9/2021 | Periyagaram et al. | |

FOREIGN PATENT DOCUMENTS

| | | |
|---|---|---|
| EP | 1913480 B1 | 12/2010 |
| EP | 3552108 B1 | 8/2021 |
| KR | 20210106597 A | 8/2021 |
| WO | 2008150927 A2 | 12/2008 |

\* cited by examiner

SYSTEMS, METHODS, AND APPARATUS FOR ACCESSING DATA IN VERSIONS OF MEMORY PAGES

REFERENCE TO RELATED APPLICATION

This application claims priority to, and the benefit of, U.S. Provisional Patent Application Ser. No. 63/400,041 filed Aug. 22, 2022 which is incorporated by reference.

TECHNICAL FIELD

This disclosure relates generally to memory systems, and more specifically to systems, methods, and apparatus for accessing data in versions of memory pages.

BACKGROUND

A memory system may include different types of memory such as volatile memory and/or nonvolatile memory. Volatile memory may be configured as a memory cache to provide relatively faster access to data and/or to store data that may be accessed relatively frequently. Data stored in a cache may also be stored in a main memory which may be implemented, for example, with nonvolatile memory that may retain data across a power cycle.

The above information disclosed in this Background section is only for enhancement of understanding of the background of the inventive principles and therefore it may contain information that does not constitute prior art.

SUMMARY

An apparatus may include at least one memory, and at least one processor configured to determine an accessibility of a first version of a page, wherein the first version of the page is stored in the at least one memory, and perform, based on the accessibility of the first version of the page, an access of at least a portion of a second version of the page, wherein the second version of the page is stored in the at least one memory. The accessibility of the first version of the page may be based on an erase operation of the first version of the page. The accessibility of the first version of the page may be based on an amount of accesses of the first version of the page. The accessibility of the first version of the page may be further based on an amount of accesses of the second version of the page. The access of the at least a portion of the second version of the page may include an access of a cache line of the second version of the page. The access of the at least a portion of the second version of the page may be based on a modification status of the first version of the page. The access of the at least a portion of the second version of the page may include an access of a portion of the second version of the page, and the modification status of the first version of the page may be based on a modification status of a portion of the first version of the page corresponding to the portion of the second version of the page. The portion of the first version of the page may include a cache line of the first version of the page, and the portion of the second version of the page may include a cache line of the second version of the page corresponding to the cache line of the first version of the page. The at least one processor may be configured to track a modification status of the at least a portion of the second version of the page. The access of the at least a portion of the second version of the page may include a read operation. The at least one processor may be configured to store, in a first superblock, the first version of the page, and store, in a second superblock, the second version of the page. The method may further include a cache configured to store the first version of the page, wherein the at least one processor may be configured to track a modification status of the first version of the page. The at least one processor may be configured to evict the first version of the page based on the modification status of the first version of the page. The apparatus may include a storage device, and the at least one memory may include at least one storage media. The storage device may be configured to operate in a coherent memory mode.

A method may include determining an accessibility of a first version of a page, wherein the first version of the page may be stored in at least one memory, and accessing, based on the accessibility of the first version of the page, at least a portion of a second version of the page, wherein the second version of the page may be stored in the at least one memory. The method may further include determining a modification status of a portion of the first version of the page, wherein the accessing the at least a portion of the second version of the page may include accessing a portion of the second version of the page corresponding to the portion of the first version of the page.

An apparatus may include at least one memory, and at least one processor configured to store a first version of a page in at least one memory, store a second version of the page in the at least one memory, and track a modification status of at least a portion of the first version of the page. The modification status of the at least a portion of the first version of the page may include a modification status of a portion of the first version of the page. The portion of the first version of the page may include a cache line.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
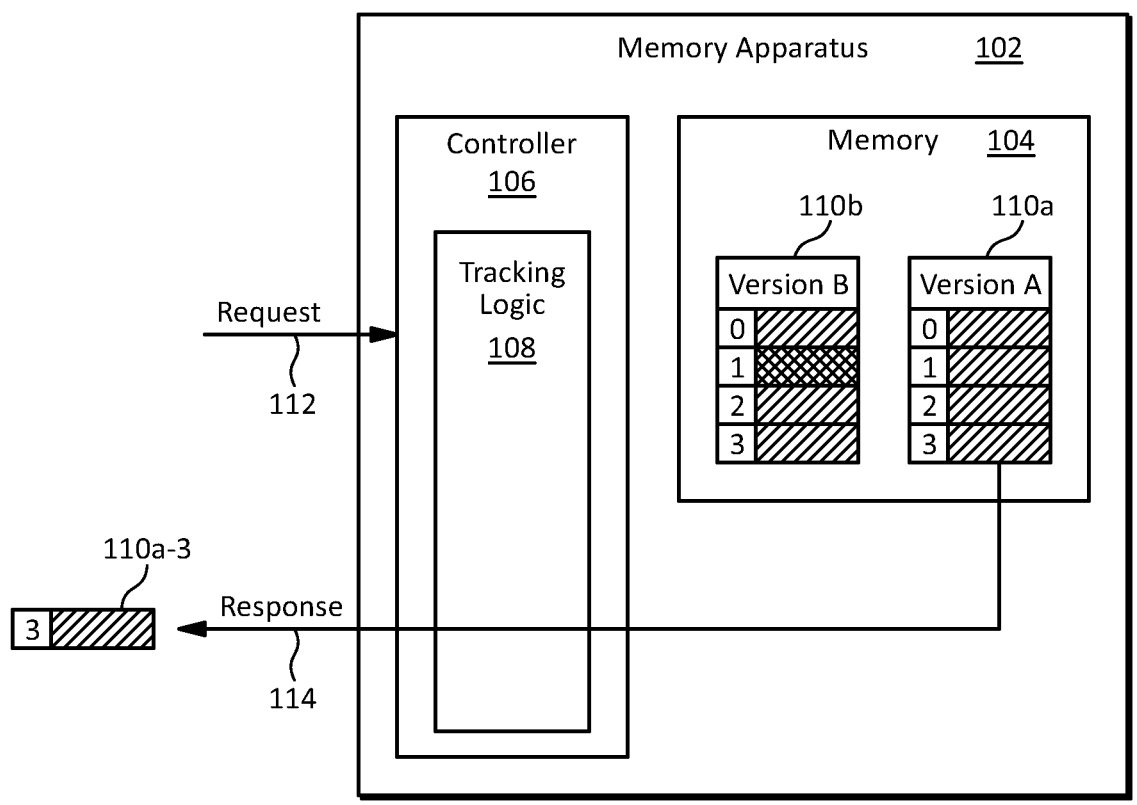
FIG. 1 illustrates an embodiment of a memory apparatus in accordance with example embodiments of the disclosure.

A memory system may store multiple versions of a page of data. For example, some memory systems may store data in nonvolatile memory that may be accessed (e.g., written or read) in units of pages. However, the nonvolatile memory may be erased in larger units of blocks that may include multiple pages. To modify a portion of a page of data that is stored in nonvolatile memory, the memory system may write an updated page of data (which may include both modified and unmodified portions) to a new page of nonvolatile memory. The updated page of data (and/or the new page of nonvolatile memory in which it may be stored) may be referred to as a valid page. The original page of data (and/or the original page of nonvolatile memory in which it may be stored) may be referred to as an invalid page. The invalid page may be marked for eventual erasure, for example, when the block in which it is located is filled with invalid pages. Thus, the memory system may store, at least temporarily, two different versions of a page of data: an invalid version (e.g., an original or earlier version) that may include at least some invalid data (e.g., data that has been modified in a corresponding updated version of the page), and a valid version (e.g., an updated or later version) that may include only valid data (or more recently updated data than the invalid version).

The memory system may retrieve a valid version of a page of data by reading the page of memory in which it may be stored. In some cases, however, the valid page of memory may not be readily accessible. For example, if the valid page of memory is located on a memory die (e.g., an integrated circuit (IC) chip) that is undergoing an erase operation, the memory system may wait until the erase operation is completed before reading the valid page of memory. Alternatively, the memory system may suspend the erase operation to read the valid page of memory. However, suspending the erase operation may still slow down the read operation. As another example, the valid page of memory may not be readily accessible because it may be located on a busy memory die or channel that may have a relatively large number of input and/or output (I/O or IO) operations pending. Thus, there may still be a relatively long delay for the memory system to read the valid page of memory.

A memory system may receive a read request for only a portion of a page of data stored in memory (e.g., nonvolatile memory). If the page of data stored in memory was previously updated such that there is also an invalid version of the page stored in memory, the requested portion of the page may still be valid in the invalid version of the page. For example, the requested portion of data stored in the invalid page may not have been modified in the valid version of the page when the valid version of the page was updated and/or stored.

A memory scheme in accordance with example embodiments of the disclosure may access a requested portion of a page of data from an invalid version of the page, for example, if the requested portion of data is valid in the invalid version of the page. Depending on the implementation details, this may reduce the amount of time involved in accessing the requested data, for example, if a corresponding valid version of the page is not readily accessible (e.g., if the valid page is stored on a memory die that is busy or being erased). Depending on the implementation details, if the target cache line is unmodified, the memory request may be quickly served by reading the target cache line from an invalid page without interrupting an erase operation.

In some embodiments, invalid data in an invalid version of a page may be referred to as modified data because (e.g., a modified cache line), even though the actual data in the invalid version of the page may not have changed, it may correspond to a portion of a valid version of the page that may have been modified when the valid version of the page was updated and/or stored. Similarly, in some embodiments, valid data in an invalid version of a page may be referred to as unmodified data (e.g., an unmodified cache line) because it may correspond to a portion of a valid version of the page that may not have been modified when the valid version of the page was updated and/or stored.

Some embodiments may implement one or more schemes for tracking valid data in invalid pages. For example, an invalid page mapping data structure may map a logical page number for a valid page of data to a physical page number for an invalid version of the page. The data structure may also indicate the location of valid data within the invalid version of the page, for example, using a map of valid portions of data in the invalid version of the page.

A scheme for accessing data in different versions of a page of data may be used in conjunction with a data cache scheme in accordance with example embodiments of the disclosure. For example, a valid version of a page of data may initially be stored in both a cache memory and a main memory (e.g., a nonvolatile memory). In a write back configuration, modified data may be written to the version of the page in the cache memory, and a cache page tracking data structure may be updated to indicate one or more portions of the version of the page in cache memory that are modified compared to the version of the page stored in main memory (which may be referred to as an invalid page). When the version of the page in the cache memory (which may be referred to as a valid page) is removed from the cache memory (e.g., through eviction), it may be written to a new page in the main memory. The cache page tracking data structure may be used to update an invalid page mapping data structure to track valid and invalid data in the invalid version of the page in the main memory.

In a write through configuration, modified data may be written to the page in the cache memory which may also be written to a new page in the main memory. Thus, a valid version of a page containing the modified data may be stored in both the cache memory and the main memory. If an earlier version of the page is present in the main memory, an invalid page mapping data structure may be updated to indicate one or more portions of the valid version of the page (in the cache memory and main memory) have been modified compared to the earlier version of the page (which may be referred to as an invalid page).

This disclosure encompasses numerous inventive principles. The principles disclosed herein may have independent utility and may be embodied individually, and not every embodiment may utilize every principle. Moreover, the principles may also be embodied in various combinations, some of which may amplify some benefits of the individual principles in a synergistic manner.

FIG. 1 illustrates an embodiment of a memory apparatus in accordance with example embodiments of the disclosure. The memory apparatus 102 may include a memory 104 and a controller 106. The controller 106 may store multiple versions of a page of data in the memory 104. For example, as shown in FIG. 1, the controller 106 may store a first version 110a of a page of data (referred to as Version A) in the memory 104. Version A may include portions 0, 1, 2, and 3 that may include first versions of portions of the page of data as indicated by single diagonal shading.

The controller 106 may also store a second version 110b of the page of data (referred to as Version B) in the memory 104. Version B may include portions 0, 2, and 3 in which the data (or relevant parts thereof) may be effectively the same as the data in portions 0, 2, and 3, respectively, of Version A. However, portion 1 of Version B may include data that is effectively different from the data in portion 1 of Version A as shown by diagonal cross shading. Version B of the page of data may be created, for example, by modifying portion 1 of Version A.

The controller 106 may include tracking logic 108 that may track the data in one or more of the portions of data in the first version 110a (Version A) of the page of data and/or the second version 110b (Version B) of the page of data. For example, the tracking logic 108 may use a data structure (e.g., a mapping table) to track which portions of Version A of the page of data are effectively the same as the corresponding portions of Version B, and which portions are effectively different.

The controller 106 may receive a request 112 to access (e.g., read) portion 3 of Version B of the page of data stored in memory 104. The tracking logic 108 may determine that the data in portion 3 of Version A of the page of data is effectively the same as the data in portion 3 of Version B of the page of data. Thus, the controller 106 may service the request 112 by accessing Version A of the page of data and sending portion 3 of Version A (indicated as 110a-3) with a response 114 to the request 112.

The embodiment illustrated in FIG. 1 is not limited to any specific reason for accessing a specific version of a page of data. In some embodiments, however, the controller 106 and/or tracking logic 108 may access Version A of the page of data if Version B is relatively less accessible than Version A, for example, because Version B may be located on a memory die, module, card, server, rack, and/or the like, that may be undergoing an erase operation, experiencing relatively high traffic, experiencing a malfunction, power outage, and/or the like, have a relatively long latency, have a relatively high power consumption, have a relatively low bandwidth, and/or the like.

The embodiment illustrated in FIG. 1 is not limited to any specific order, reason, and/or the like, for storing the versions 110a and 110b of the page of data. In some embodiments, however, the memory 104 may be implemented with nonvolatile memory that may be accessed (e.g., written and/or read) in units of pages and erased in units of blocks that may include multiple pages. Version A may be an earlier version of a page of data stored in memory 104, and Version B may be a later version in which portion 1 has been updated with new data. Because memory 104 may be written in units of pages, Version B may be written to a new page of memory 104 to update portion 1. Thus, Version A may still be present in memory 104, at least temporarily, until Version A is erased, for example, through a garbage collection process.

The embodiment illustrated in FIG. 1, and/or components thereof, are not limited to any specific form or construction. For example, in some embodiments, the memory apparatus 102, memory 104, and/or controller 106 may be implemented, at least partially, with one or more memory devices such as individual or stacked memory die (e.g., an integrated circuit (IC) chips) based on any memory technology including volatile memory such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof. In some embodiments, any such memory may be located at one or more modules, cards, servers, racks, and/or the like, or a combination thereof. Although the tracking logic 108 is illustrated as part of the controller 106, it may be implemented, partially, or entirely, as a separate component and/or as part of another component such as the memory 104 or any other component of the memory apparatus 102.

As another example, in some embodiments, the memory apparatus 102, memory 104, and/or controller 106 may be implemented, at least partially, with a storage device that may include any type of nonvolatile storage media based, for example, on solid state media (e.g., a solid state drive (SSD)), magnetic media (e.g., a hard disk drive (HDD)), optical media, and/or the like, or any combination thereof. In some embodiments, the memory apparatus 102 may be implemented, at least partially, with an SSD based on not-AND (NAND) flash memory, persistent memory, and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof. In some embodiments, the memory apparatus 102 may be implemented, at least partially, with a memory controller and/or one or more memory devices, modules, and/or the like located on a circuit board, for example, in a host computer, a server computer (e.g., a compute server, storage server, network server, and/or the like), a node (e.g., a storage node, compute node, and/or the like), or any combination thereof.

As a further example, the memory apparatus 102, memory 104, and/or controller 106 may communicate using any type of wired and/or wireless communication medium, interface, network, interconnect, protocol, and/or the like including Peripheral Component Interconnect Express (PCIe), Non-volatile Memory Express (NVMe), NVMe over Fabric (NVMe-oF), Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), Direct Memory Access (DMA), Remote DMA (RDMA), RDMA over Converged Ethernet (ROCE), Advanced Message Queuing Protocol (AMQP), Ethernet, Transmission Control Protocol/Internet Protocol (TCP/IP), FibreChannel, InfiniBand, Serial ATA (SATA), Small Computer Systems Interface (SCSI), Serial Attached SCSI (SAS), iWARP, any generation of wireless network including 2G, 3G, 4G, 5G, 6G, and/or the like, any generation of Wi-Fi, Bluetooth, near-field communication (NFC), and/or the like, or any combination thereof.

For purposes of illustration, some example embodiments may be described in the context of some example implementation details such as a memory apparatus implemented with a storage device that is capable of operating in a memory mode. However, the inventive principles are not limited to these or any other implementation details.

Figure 2:
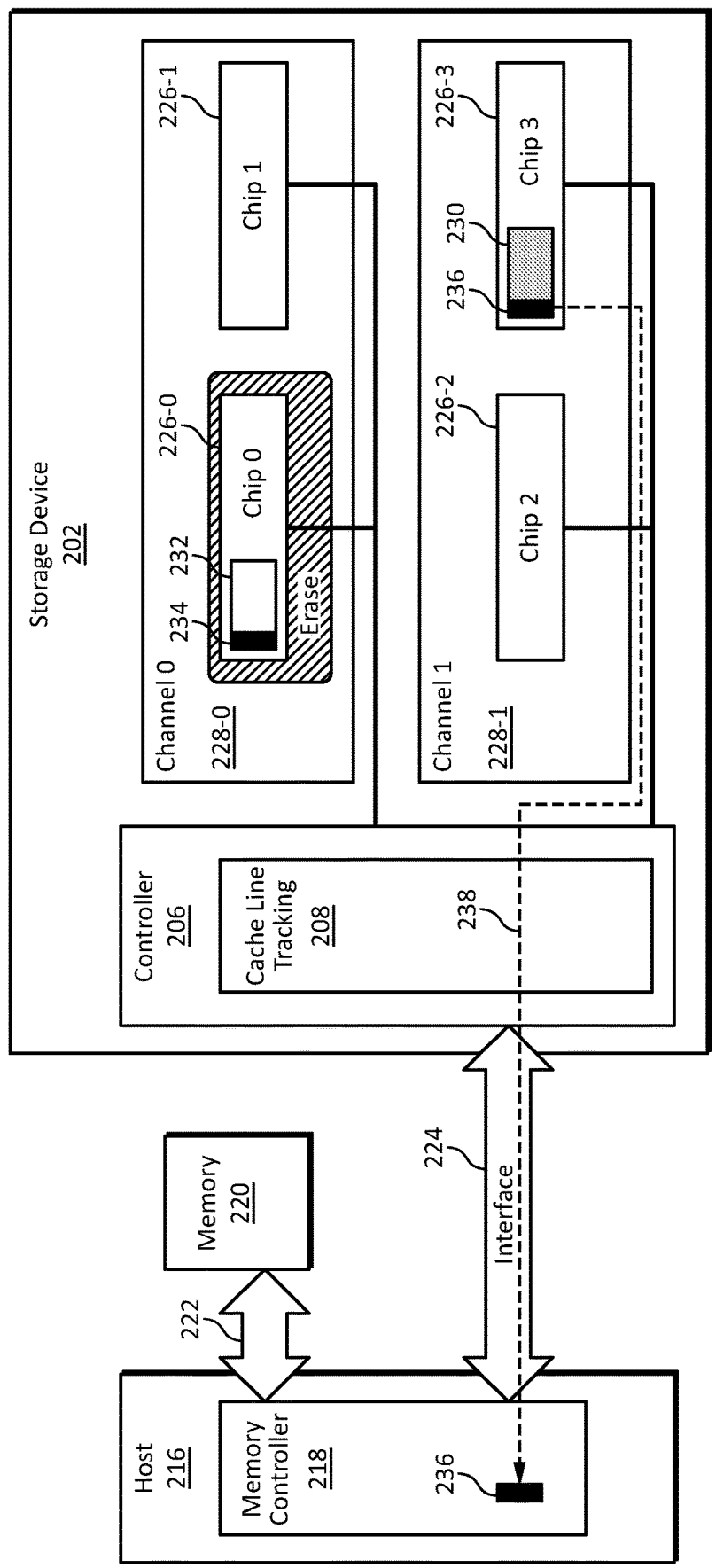
FIG. 2 illustrates an embodiment of a memory access scheme in accordance with example embodiments of the disclosure.

FIG. 2 illustrates an embodiment of a memory access scheme in accordance with example embodiments of the disclosure. The scheme illustrated in FIG. 2 may include a host 216, a memory 220, and a storage device 202. The storage device 202 may be implemented, for example, as an embodiment of the memory apparatus 102 illustrated in FIG. 1. The host 216 may communicate with the storage device 202 using a communication interface 224 that may be implemented, for example, with any type of interconnect, network, interface, protocol, and/or the like as described above with respect to the embodiment illustrated in FIG. 1.

Although the communication interface 224 is not limited to any specific implementation details, for purposes of illustrating the inventive principles, the communication interface 224 illustrated in FIG. 2 may be implemented with a CXL interconnect using the CXL.mem protocol. The storage device 202 may be configured to operate, at least partially, in a memory mode (e.g., a CXL cache coherent memory mode) wherein some or all of the storage media in the storage device 202 may be accessible to the host 216 as memory (e.g. storage class memory) using the CLX.mem protocol.

The host 216 may also communicate with the memory 220 using any suitable memory interface 222. For example, if the memory 220 is implemented with DRAM, the memory interface 222 may be implemented with any version (e.g., generation) of the double data rate (DDR) specification including DDR3, DDR4, DDR5, or any other current or future version.

The host 216 may include a memory controller 218 that may implement a memory scheme in which the memory 220 and storage media in the storage device 202 may be tiered, cached, buffered, and/or the like.

The storage device 202 may include a controller 206 and any type and/or amount of storage media. For purposes of illustration, the storage device 202 may include four NAND flash memory chips 226-0 through 226-3 (indicated as Chip 0 through Chip 3, respectively) arranged in two channels 228-0 and 228-1 (indicated as Channel 0 and Channel 1, respectively), and the controller 206 may be implemented with a flash translation layer (FLT).

The controller 206 may implement a memory scheme that may map logical page numbers (LPNs) to physical page number (PPNs). The logical-to-physical mapping may enable the controller 206 to implement page-based memory access (e.g., memory may be written and/or read in units of pages) and block-based erasure (e.g., memory may be erased in multiple-page units of blocks).

The memory controller 218 at the host 216 may request memory accesses (e.g., reads and/or writes) of data in units such as cache lines that may be smaller than a page. Because memory may be written (e.g., programmed) to the memory chips 226-0 through 226-3 in units of pages, when the controller 206 updates (e.g., modifies) a portion of a page (e.g. a cache line in a page), it may write an updated page of data including the updated portion (e.g., a modified cache line) to a new page of memory (which may be referred to as a valid page) and invalidate the previous version of the page (which may be referred to as an invalid page).

Invalid pages may be erased, for example, through a garbage collection process in which a block (e.g., an entire block) containing one or more invalid pages may be erased. If the block contains any valid pages, the valid pages may be moved to a new block before the block is erased.

The controller 206 may include cache line tracking logic 208 that may track invalid pages and/or portions (e.g., cache lines) of invalid pages that may be valid and/or invalid (e.g., unmodified and/or modified cache lines). Depending on the implementation details, the cache line tracking logic 208 may enable the controller 206 to access valid data in an invalid page. For example, the controller 206 may store a first version 230 of a page of data in Chip 3. If the memory controller 218 at the host 216 sends the controller 206 a write request to update data stored in a portion (e.g., a request to modify a cache line) stored in the page 230, the controller may store a second version 232 of the page of data (including the modified cache line) in Chip 0. Thus, the second version 232 of the page stored in Chip 0 may be a valid page, and the first version 230 of the page stored in Chip 3 may be an invalid page. The cache line tracking logic 208 may track (e.g., using a tracking data structure) which portions (e.g., cache lines) of the first version 230 of the page and/or the second version 232 of the page are valid and/or invalid (e.g., which cache lines are unmodified and/or modified).

The memory controller 218 at the host 216 may send the controller 206 a read request to read a portion 234 (e.g., a cache line) of the valid page 232 stored in Chip 0. If the valid page 232 is readily accessible, the controller 206 may read the portion 234 of the valid page 232 from Chip 0 and send the portion 234 with a response to the memory controller 218. However, in some circumstances, the valid page 232 may not be readily accessible. For example, the valid page 232 and/or Chip 0 may be relatively busy with I/O requests, or Chip 0 may be undergoing an erase operation (e.g., as part of a garbage collection operation) as shown in FIG. 2. Thus, the controller 206 may wait for other I/O traffic and/or an erase operation to complete before reading valid page 232 from Chip 0. Alternatively, or additionally, the controller may temporarily suspend the erase operation to read valid page 232 from Chip 0 and resume the erase operation after reading the valid page, however, this may still delay reading the valid page as well as delaying other processes that may be based on the erase operation.

Depending on the implementation details, the cache line tracking logic 208 may determine that a portion 236 of the invalid page 230 (e.g., the first version of the page) may still contain valid data corresponding to the requested portion 234 of the valid page 232 (e.g., the second version of the page). For example, the requested portion 234 may not have been updated (e.g., may not have been modified) when the controller stored the updated page 232 in Chip 0. Thus, the portion 236 of the invalid page 230 may have the same, or effectively the same, data as the portion 234 of the valid page 232.

In some embodiments, rather than waiting for the valid page 232 stored in Chip 0 to become more readily accessible, the controller and/or cache line tracking logic 208 may read the portion 236 (e.g., cache line) of the invalid page 230 in Chip 3 and send the portion 236 to the memory interface 218 at the host 216 as shown by the dashed arrow 238. Depending on the implementation details, this may reduce the latency, power consumption, and/or the like, associated with responding to the read request.

The host 216 may be implemented with one or more of any type of apparatus such as a server, for example, a compute server, a storage server, a network server, a cloud server and/or the like, a computer such as a workstation, a personal computer, a tablet, a smart phone, and/or the like, or multiples and/or combinations thereof.

Figures 3, 4, 5:
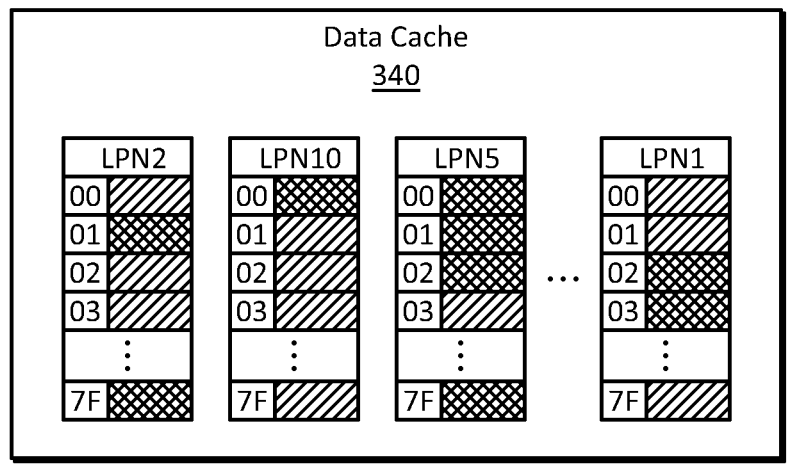
FIG. 3 illustrates an embodiment of a data cache in accordance with example embodiments of the disclosure.
FIG. 4 illustrates an embodiment of a buffered page update table in accordance with example embodiments of the disclosure.
FIG. 5 illustrates an embodiment of an invalid page mapping table in accordance with example embodiments of the disclosure.

FIG. 3 illustrates an embodiment of a data cache in accordance with example embodiments of the disclosure. The data cache 340 may be used, for example, in combination with the memory scheme illustrated in FIG. 2 to provide caching of data that may be stored, at least eventually, in the storage media (e.g., nonvolatile memory such as flash memory) of storage device 202. The data cache 340 may be implemented, for example, in the storage device 202 illustrated in FIG. 2.

Referring to FIG. 3, the data cache 340 may be implemented, for example, with volatile memory (e.g., DRAM) that may be addressable at a granularity such as bytes, cache lines, and/or the like, that may be smaller than a page. Data stored in the data cache 340 may be organized in logical pages that may be identified by logical page numbers such as LPN1, LPN2, LPN5, and/or LPN10 as illustrated in FIG. 3. A page may include one or more cache lines indicated by the index in the left column of the page.

A version of data contained in a cache line may be indicated by the shading in the right column of the cache line. In the example illustrated in FIG. 3, single diagonal shading may indicate a first version of data, for example, data that may have been present in the cache line when the page was first loaded into the data cache 340. Additionally, or alternatively, the first version of data indicated by the single diagonal shading may indicate data that was present in the page the last time the page was saved to nonvolatile memory, for example, in the storage medio of a storage device.

A modified cache line, for example, a cache line containing a second version of data (e.g., a later version of data), may be indicated by diagonal cross shading. A cache line may be indicated as modified, for example, if new data has been written to the cache line since the page was first loaded, since the page was last stored in nonvolatile memory, and/or the like. For example, in the embodiment illustrated in FIG. 3, in the page indicated as LPN2, cache lines 00, 02, and/or 03 may include unmodified data, and cache lines 01 and/or 7F may include modified data.

The pages and cache lines illustrated in FIG. 3 are not limited to any specific implementation details such as numbers and/or sizes of pages, cache lines, and/or the like. For purposes of illustration, however, an example embodiment may be implemented with pages that contain 8192 bytes divided into 128 cache lines (numbered 00-7F) containing 64 bytes.

FIG. 4 illustrates an embodiment of a buffered page update table in accordance with example embodiments of the disclosure. The buffered page update table 442 may be used, for example, to track cache lines that have been updated in pages stored in a data cache such as the data cache 340 illustrated in FIG. 3. The buffered page update table 442 may be implemented, for example, in the cache line tracking logic 208 illustrated in FIG. 2. In some embodiments, the buffered page update table 442 may be used to track buffered cache lines in a data cache configured for operation with a CXL.mem protocol.

Referring to FIG. 4, the buffered page update table 442 may be implemented, for example, as a hash table and may include one or more entries (e.g., horizontal rows) corresponding to one or more pages stored in a data cache. An entry may include a page identifier (e.g., an LPN) for the corresponding page in the data cache and a bitmap to record which cache lines in the corresponding page have been modified. For example, the top row of buffered page update table 442 may include the identifier LPN2 in the first column to indicate it may track modified cache lines in LNP2, and a bit map in the following columns. In the example illustrated in FIG. 4, a logical 1 may indicate an unmodified cache line, and a logical 0 may indicate a modified cache line. Although the buffered page update table 442 is not limited to any specific implementation details, in the example illustrated in FIG. 4, the entries may include bitmaps with 128 bits (00-7F) corresponding to the number of cache lines in the pages in the data cache illustrated in FIG. 3.

The buffered page update table 442 may be implemented using any type of memory and/or persistence scheme. For example, in some embodiments, the buffered page update table 442 may be implemented in DRAM in a storage device, and may be created at runtime. In embodiments in which the data cache is saved to nonvolatile memory (e.g., at a power-down event), the buffered page update table 442 may also be saved to nonvolatile memory.

An entry may be removed from the buffered page update table 442, for example, when a corresponding page is evicted from a data cache. Alternatively, or additionally, an entry may be removed from the buffered page update table 442 when a number of unmodified cache lines in the bitmap of the entry drops below a threshold value.

In some embodiments, the buffered page update table 442 may be used to track modified and unmodified cache lines for cached pages in a write back cache scheme in which an updated page may only be stored in main memory (e.g., nonvolatile memory) based on one or more specific events such as a page being evicted from the cache, a power-down event, and/or the like.

FIG. 5 illustrates an embodiment of an invalid page mapping table in accordance with example embodiments of the disclosure. The invalid page mapping table 544 may be used, for example, to track cache lines that may still be valid in invalidated versions of pages (e.g., recently invalidated pages) that may be stored in physical pages in main memory (e.g., nonvolatile memory) and may correspond to updated logical pages (e.g., valid pages) that may also be stored in main memory. The invalid page mapping table 544 may be implemented, for example, in the cache line tracking logic 208 illustrated in FIG. 2. In some embodiments, the invalid page mapping table 544 may be used to track previously buffered cache lines in a data cache configured for operation with a CXL.mem protocol.

Referring to FIG. 5, the invalid page mapping table 544 may be implemented, for example, as a hash table and may include one or more entries (e.g., horizontal rows) corresponding to one or more physical pages (e.g., invalid pages) that may be mapped to one or more corresponding logical pages (e.g., corresponding valid pages). Thus, an entry may include a page identifier (e.g., an LPN) for a valid page and a page identifier (e.g., a PPN) for a corresponding invalid page. An entry may also include a bitmap to record which cache lines in the valid page have been modified relative to the invalid page.

For example, the top row of invalid page mapping table 544 may include the identifier LPN2 in the first column and the identifier PPN2 in the second to indicate that the page at PPN2 may be an invalid version of the page identified as LPN2. Some embodiments may include an additional page mapping table that may map the valid version of the page identified as LPN2 to a valid version stored in another physical page. In the example illustrated in FIG. 5, in the bitmap columns for the entry in the top row (indicated as 00-7F), a logical 1 may indicate that the corresponding cache line in the valid version of the page has not been modified relative to the corresponding cache line in the invalid version of the page, and thus, the corresponding cache line in the invalid version of the page is valid. A logical 0 may indicate that the corresponding cache line in the valid version of the page has been modified relative to the corresponding cache line in the invalid version of the page, and thus, the corresponding cache line in the invalid version of the page is invalid.

In some embodiments, the invalid page mapping table 544 may record the most recently invalidated physical pages (e.g., PPN2) that were mapped to the corresponding logical pages (e.g., LPN2). In some embodiments, the invalid page mapping table 544 may be maintained using a least recently used (LRU) policy that may remove the older entries from the table. Some embodiments may limit the size of the table, for example, by removing an entry for a logical page and/or a physical page in which the number of unmodified cache lines is less than a threshold value. Thus, in some embodiments, the invalid page mapping table 544 be used partially, primarily, or only for active regions of memory (which may be referred to as hot regions of memory). In some embodiments, entries may be selected for inclusion and/or removal from the invalid page mapping table 544 based on recency of use, frequency of use, and/or the like. In some embodiments, entries may be selected for inclusion and/or removal from the invalid page mapping table 544 based on one or more machine learning (ML) algorithms.

Although the invalid page mapping table 544 is not limited to any specific implementation details, in the example illustrated in FIG. 5, the entries may include bitmaps with 128 bits (00-7F) corresponding to the number of cache lines in the pages in the data cache illustrated in FIG. 3. The invalid page mapping table 544 may be implemented using any type of memory and/or persistence scheme. For example, in some embodiments, the invalid page mapping table 544 may be implemented in volatile memory such as DRAM in a storage device, and may be created at runtime. In embodiments in which the data cache is saved to nonvolatile memory (e.g., at a power-down event), the invalid page mapping table 544 may also be saved to nonvolatile memory.

Figure 6A:
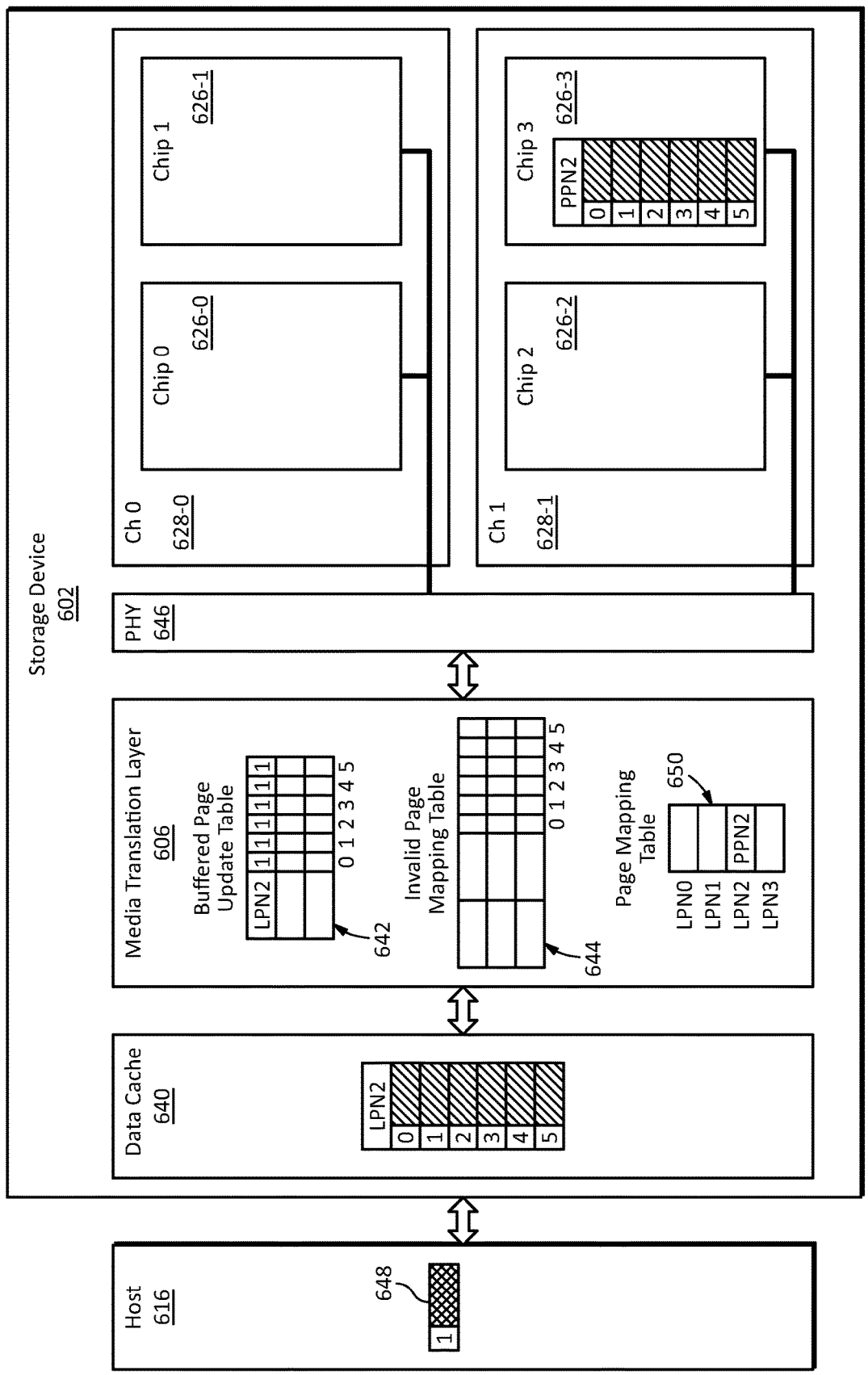
FIG. 6A illustrates an example embodiment of a memory apparatus in a first state relating to a write operation in accordance with example embodiments of the disclosure.
Figure 6B:
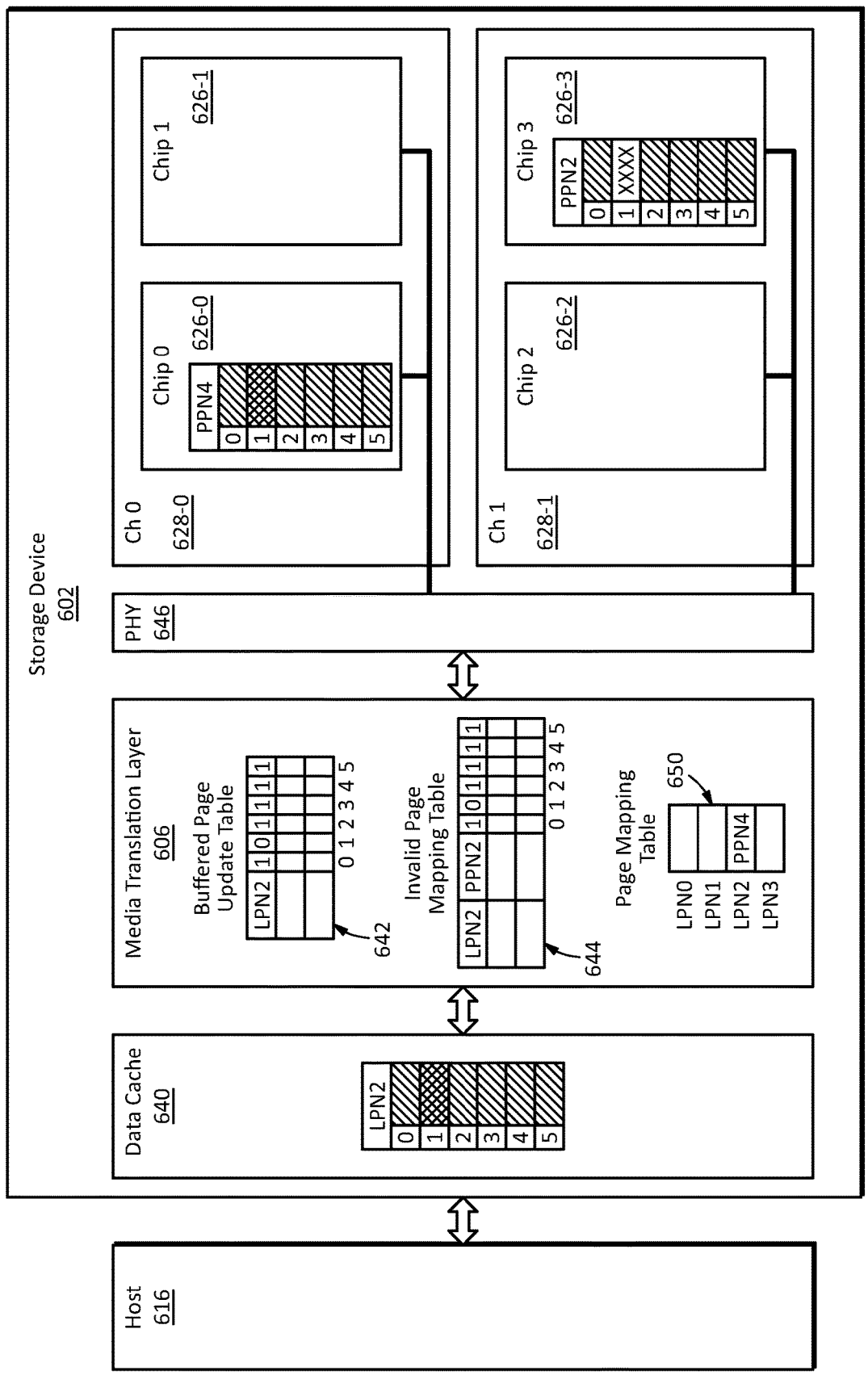
FIG. 6B illustrates the example embodiment of the memory apparatus illustrated in FIG. 6A in a second state relating to a write operation in accordance with example embodiments of the disclosure.

FIG. 6A illustrates an example embodiment of a memory apparatus in a first relating to a write operation in accordance with example embodiments of the disclosure. FIG. 6B illustrates the example embodiment of the memory apparatus illustrated in FIG. 6A in a second state relating to a write operation in accordance with example embodiments of the disclosure. FIG. 6A and FIG. 6B collectively illustrate a write operation in accordance with example embodiments of the disclosure and may be referred to collectively and/or individually as FIG. 6. The embodiment illustrated in FIG. 6 may be implemented, for example using any of the apparatus disclosed herein including the apparatus illustrated in FIG. 1 through FIG. 5 above.

Referring to FIG. 6A, the memory apparatus may include a host 616 and a storage device 602. The host 616 and storage device 602 may be configured to communicate, for example, using a CXL interface in which the storage device 602 may be configured to operate, at least partially, in a memory mode (e.g., a CXL cache coherent memory mode) wherein some or all of the storage media in the storage device 602 may be accessible to the host 616 as memory (e.g. storage class memory) using the CLX.mem protocol.

The storage device 602 may include a data cache 640, a media translation layer 606, a physical layer 646, and one or more memory chips 626-0 through 626-3 (indicated as Chip 0 through Chip 3) arranged in one or more channels 628-0 and 628-1 (indicated as Ch 0 and Ch 1). The data cache 640 may be implemented, for example, using volatile memory such as DRAM and may be configured to store pages of data that may include one or more cache lines. The media translation layer 606 may perform one or more functions related to translating data between a format in which is received from and/or sent to a host and a format that may be suitable for an underlying storage media used for the memory channels Ch 0 and Ch 1. For example, if the memory chips 626-0 through 626-3 are implemented with flash memory (e.g., NAND flash memory), the media translation layer 606 may be implemented as a flash translation layer. The media translation layer 606 may include a page mapping table 650 that may map LPNs for valid pages of data to PPNs of memory that may store the valid pages of data using the LPNs as an index. The media translation layer 606 may also include a buffered page update table 642 and/or an invalid page mapping table 644 which may be, for example, similar to those described above with respect to FIG. 4 and FIG. 5.

The physical layer 646 may implement a physical interface between the media translation layer 606 and memory chips 626-0 through 626-3.

For purposes of illustration, the embodiments illustrated in FIG. 6 may be shown with pages having six cache lines, but the inventive principles are not limited to these or any other implementation details. In the embodiments illustrated herein, cache lines and/or pages illustrated with the same type of shading (e.g., single diagonal shading, diagonal cross shading, vertical and horizontal cross shading, and/or the like) may include the same or similar versions of data.

FIG. 6A illustrates an initial state of the apparatus before a write operation. FIG. 6B illustrates a state of the apparatus after the write operation. Referring to FIG. 6A, a first version of a page of data indicated as LPN2 may be stored in the data cache 640. LPN2 may include six cache lines indicated as 0 through 5. The six cache lines may include first versions of data as indicated by the single diagonal shading. The first version of the page of data indicated as LPN2 may also be stored as a physical page indicated as PPN2 in Chip 3. Thus, in the initial state before a write operation, the page mapping table 650 may include an entry that may map LPN2 to PPN2. In this example, there may not be an invalid version of LPN2 stored in the storage device 602, and thus, the invalid page mapping table 644 may not have an entry for LPN2.

Because the page of data indicated as LPN2 is stored in the data cache 640, the buffered page update table 642 may include an entry for LPN2. The version of the page of data indicated as LPN2 in the data cache 640 may not have been updated since it was written to the cache, or since it was stored to Chip 3, and therefore, in the initial state before a write operation, the bitmap for LPN2 in the buffered page update table 642 may include all 1 s to indicate that none of the cache lines have been modified.

Also in the initial state before a write operation, the host 616 may include a cache line 648 with updated data shown with diagonal cross shading that the host may send to the storage device 602 to modify Cache Line 1 (which may be referred to as a target cache line) of LPN2.

A write operation may include any number of the following operations indicated as operations (1) through (6). The operation numbers are provided for purposes of identifying the operations and do not necessarily indicate an order in which the operations may be performed. Thus, in some embodiments, the order of the operations may be changed, one or more operations may be omitted, and one or more additional operations may be included. Moreover, although one or more of the operations described with respect to FIGS. 6A and 6B may be described as being performed by the media translation layer 606, in some embodiments, one or more of the operations may be performed by any other apparatus such as a storage device controller, communication interface, NVMe controller, and/or the like.

(1) The host 616 may send a write request to the storage device 602 along with the updated Cache Line 1 for LPN2. In the Example illustrated in FIG. 6A, the page LPN2 is already present in the data cache 640 which may be referred to as a cache hit. Alternatively, if LPN2 is not present in the data cache 640 (which may be referred to as a cache miss), the buffered page update table 642 may not include an entry for LPN2. In the event of a cache miss, the media translation layer 606 may search the page mapping table 650 to find a physical page corresponding to LPN2 (in this example PPN2). The media translation layer 606 may read physical page PPN2 from the storage media (in this example Chip 3), load the page into the data cache 640, and place an entry for LPN2 in the buffered page update table 642.

(2) The media translation layer 606 may write the updated Cache Line 1 data (shown with diagonal cross shading) into Cache Line 1 of LPN2 in the data cache 640 as illustrated in FIG. 6B.

(3) The media translation layer 606 may clear (e.g., change to logical 0) the bit corresponding to Cache Line 1 in the bitmap portion of the entry for LPN2 in the buffered page update table 642 as illustrated in FIG. 6B to indicate that Cache Line 1 is a modified cache line.

(4) The media translation layer 606 may write the updated valid page LPN2 including the modified Cache Line 1 (as indicated by diagonal cross shading) into a new physical page, for example, PPN4 in Chip 0 as illustrated in FIG. 6B.

(5) The media translation layer 606 may search the page mapping table 650 to determine if it includes an entry for LPN2 which may indicate that an earlier version of LPN2 is stored in the storage device 602. In this example, the presence of the entry mapping LPN2 to PPN2 may indicate that an earlier version of LPN2 is stored in PPN2 in Chip 3. The earlier version of LPN2 stored in PPN2 in Chip 3 may become an invalid page, and thus, the media translation layer 606 may place an entry for LPN2 in the invalid page mapping table 644 as illustrated in FIG. 6B. The entry for LPN2 may map LPN2 to PPN2 in the second column to indicate that PPN2 in Chip 3 may become an invalid version of LPN2.

The bitmap portion of the entry for LPN2 in the invalid page mapping table 644 may include a logical 0 in the location for Cache Line 1 to indicate that Cache Line 1 in PPN2 may correspond to the modified Cache Line 1 in the valid version of LPN2 stored in PPN4 in Chip 0, and thus, the data in Cache Line 1 in PPN2 in Chip 3 may be invalid as shown by X's in FIG. 6B. The bitmap portion of the entry for LPN2 in the invalid page mapping table 644 may include logical 1's in the locations for cache lines 0, 2, 3, 4, and/or 5 to indicate that these cache lines in PPN2 stored in Chip 3 may correspond to unmodified cache lines in the valid version of LPN2 stored in PPN4 in Chip 0, and thus, the data in cache lines 0, 2, 3, 4, and/or 5 in PPN2 may be valid as illustrated by single diagonal shading in FIG. 6B.

(6) The media translation layer 606 may update the entry for LPN2 in the page mapping table 650 to map LPN2 to the valid version of LPN2 stored in PPN4 in Chip 0 as illustrated in FIG. 6B.

Thus, after the write operation illustrated in FIG. 6A and FIG. 6B, a valid version of LPN2 (including modified Cache Line 1) may be present in both the data cache 640 and PPN4 in Chip 0, the buffered page update table 642 may indicate that Cache Line 1 of LPN2 has been modified, the page mapping table 650 may map LPN2 to the valid version of LPN2 stored in PPN4 in Chip 0, and/or the invalid page mapping table 644 may indicate that the invalid version of LPN2 stored in PPN2 may include valid data in cache lines 0, 2, 3, 4, and/or 5 corresponding to the unmodified cache lines of the valid version of LPN2. Depending on the implementation details, this may enable the media translation layer 606 to quickly determine that a valid version of a requested cache line may be available in an invalid page, for example, if a valid version of the page having the requested cache line is not readily accessible.

In some embodiments, if the data cache 640 is configured for write back operation, after completion of operations (1) through (3), the entry for LPN2 may be removed from the page mapping table 650, and the write operation may be considered complete. The apparatus illustrated in FIG. 6 may take no further action until, for example, LPN2 is evicted from the data cache 640, at which point, the media translation layer 606 may perform one or more of operations (4) through (6) to store the evicted page in storage media and, if an invalid version of LPN2 is stored in the storage device 602, track the location of the invalid page and/or the presence of valid data in the invalid page.

Figure 7:
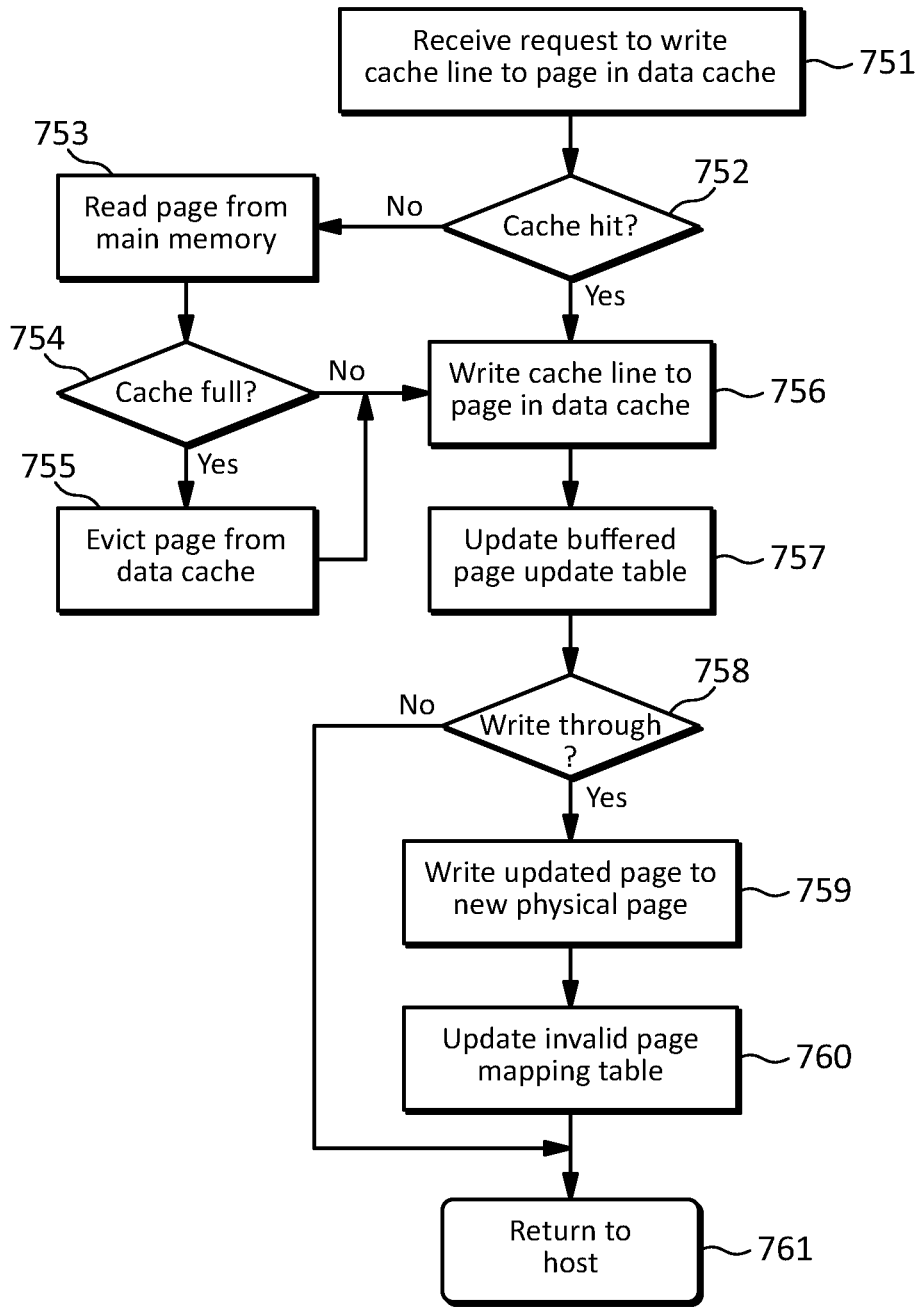
FIG. 7 illustrates an example embodiment of a method for a write operation for a memory apparatus operation in accordance with example embodiments of the disclosure.

FIG. 7 illustrates an example embodiment of a method for a write operation for a memory apparatus operation in accordance with example embodiments of the disclosure. The embodiment illustrated in FIG. 7 may be implemented, for example, using any of the apparatus disclosed herein including the apparatus illustrated in FIG. 1 through FIG. 6 above.

Referring to FIG. 7, the method may begin at operation 751 where a memory apparatus may receive (e.g., from a host) a request to write an updated cache line to a page in a data cache. At operation 752, the method may determine if the page with the requested cache line is present in the data cache (e.g., there is a cache hit). If there is a cache hit, the method may proceed to operation 756. If, however, the page is not present in the data cache (e.g., there is a cache miss), the method may proceed to operation 753 where the page with the requested cache line may be read from main memory (e.g., nonvolatile memory in a storage device).

At operation 754, the method may determine if the data cache is full. If the data cache is not full, the method may proceed to operation 756. If, however, at operation 754, the data cache is full, the method may proceed to operation 755 where a page may be evicted from the data cache. In some embodiments, a page may be selected for eviction based on an LRU policy, a number of unmodified cache lines in the page, and/or the like. For example, in some embodiments, a page may be selected for eviction if it has a relatively low number of unmodified cache lines (e.g., the least number of unmodified cache lines) which may indicate that one or more invalid pages corresponding to the selected page may include a relatively small amount of valid data. The method may proceed to operation 756.

At operation 756, the method may write the updated cache line to the page in the data cache. At operation 757, the method may update a buffered page update table, for example, to indicate that the cache line of the page in the data cache has been modified. The method may proceed to operation 758 at which the method may determine if the data cache is configured for write through or write back operation. If the data cache is not configured for write back operation, the method may proceed to operation 761.

If, however, the data cache is configured for write through operation, the method may proceed to operation 759 where the updated page in the data cache may be written to a new physical page in main memory (e.g., nonvolatile memory in a storage device). In some embodiments, a page mapping table may be updated to map an LPN of the updated page to a PPN of the new valid physical page. At operation 760, an invalid page mapping table may be updated to indicate that an invalid version of the updated page may be stored in main memory and to indicate that the cache line of the invalid version of the page corresponding to the modified cache line in the valid version of the page may contain invalid data. The method may proceed to operation 761 at which the memory apparatus may return a response (e.g., a completion, an error, and/or the like) to a host.

Figure 8A:
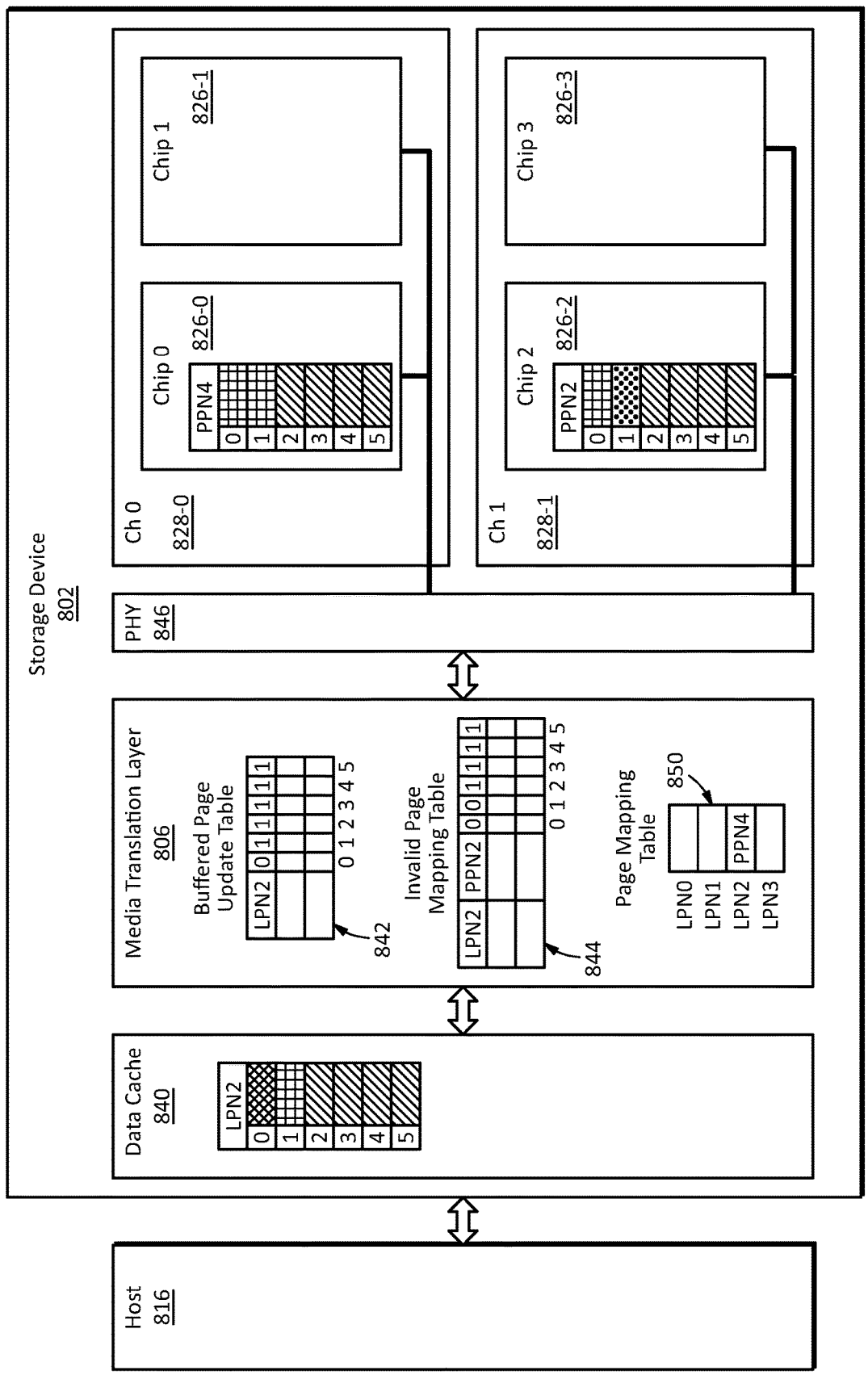
FIG. 8A illustrates an example embodiment of a memory apparatus in a first state relating to an eviction operation in accordance with example embodiments of the disclosure.
Figure 8B:
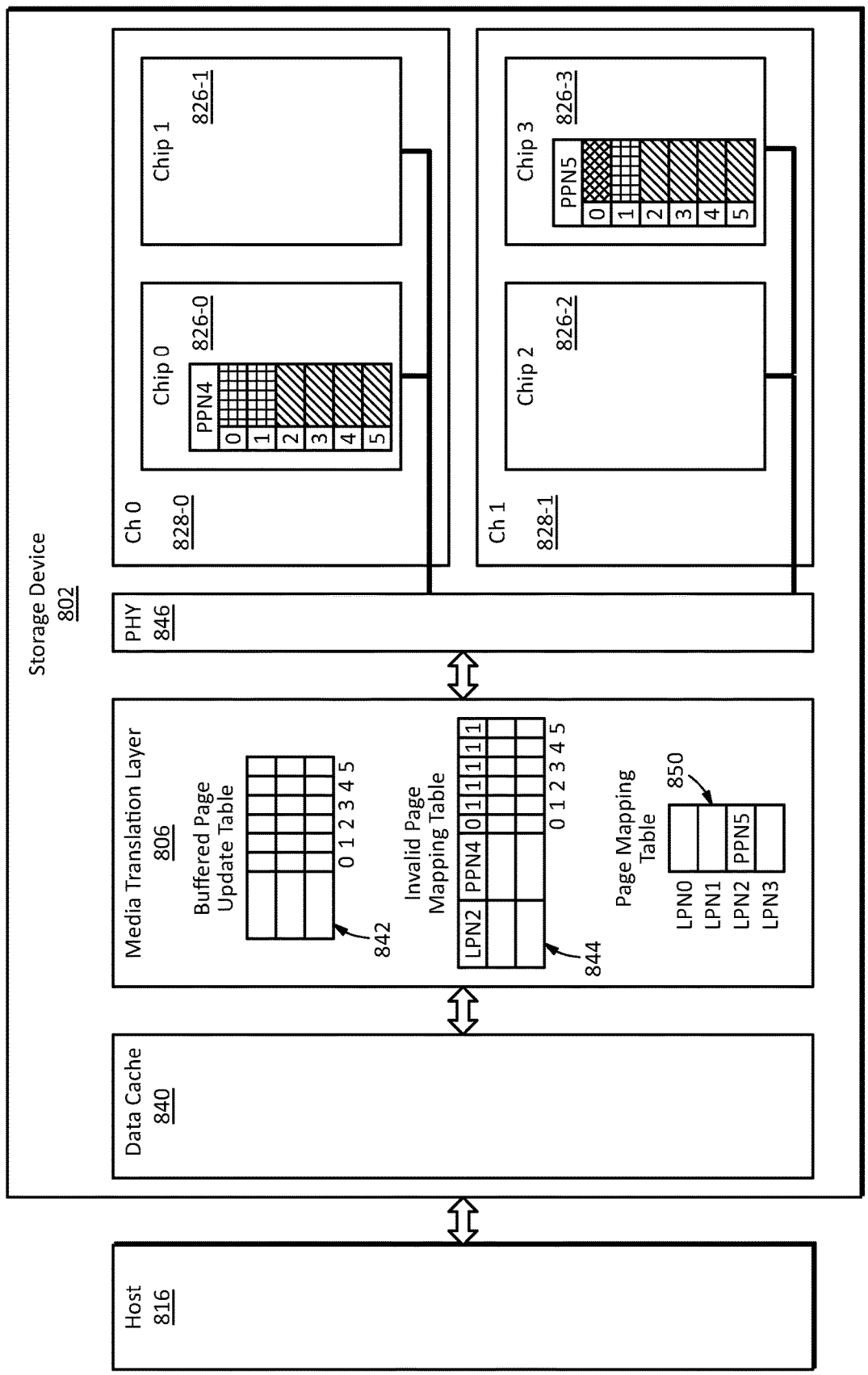
FIG. 8B illustrates the example embodiment of the memory apparatus illustrated in FIG. 8A in a second state relating to an eviction in accordance with example embodiments of the disclosure.

FIG. 8A illustrates an example embodiment of a memory apparatus in a first state relating to an eviction operation in accordance with example embodiments of the disclosure. FIG. 8B illustrates the example embodiment of the memory apparatus illustrated in FIG. 8A in a second state relating to an eviction operation in accordance with example embodiments of the disclosure. FIG. 8A and FIG. 8B collectively illustrate an eviction operation in accordance with example embodiments of the disclosure and may be referred to collectively and/or individually as FIG. 8. The embodiment illustrated in FIG. 8 may be implemented, for example using any of the apparatus disclosed herein including the apparatus illustrated in FIG. 1 through FIG. 6 above.

In some respects, the embodiment illustrated in FIGS. 8A and 8B may be similar to the embodiment illustrated in FIG. 6A and FIG. 6B, and similar components may be identified with reference designators ending in the same digits. Thus, the embodiment illustrated in FIGS. 8A and 8B may include a host 816 and a storage device 802 that may include a data cache 840, a media translation layer 806, a physical layer 846, and one or more memory chips 826-0 through 826-3 (indicated as Chip 0 through Chip 3) arranged in one or more channels 828-0 and 828-1 (indicated as Ch 0 and Ch 1). The media translation layer 806 may include a page mapping table 850, a buffered page update table 842, and/or an invalid page mapping table 844 which may be, for example, similar to those described above with respect to FIG. 6A and FIG. 6B. Moreover, the host 816 and storage device 802 may be configured to communicate, for example, using a CXL interface in which the storage device 802 may be configured to operate, at least partially, in a memory mode (e.g., a CXL cache coherent memory mode) wherein some or all of the storage media in the storage device 802 may be accessible to the host 816 as memory (e.g. storage class memory) using the CLX.mem protocol.

FIG. 8A illustrates an initial state of the memory apparatus before a data cache eviction operation. FIG. 8B illustrates a state of the memory apparatus after the data cache eviction operation. Referring to FIG. 8A, a page of data indicated as LPN2 may be stored in the data cache 840. The page LPN2 stored in the data cache 840 may include three different versions of data: Cache Line 0 may include a version of data indicated by diagonal cross shading, Cache Line 1 may include a version of data indicated by vertical and horizontal cross shading, and cache lines 2-5 may include a version of data indicated by single diagonal shading.

The page mapping table 850 may map LPN2 to a physical page PPN4 stored in Chip 0 which may include a different version of the page of data stored in LPN2 in the data cache 840. The cache line in physical page PPN4 stored in Chip 0 may include two versions of data: cache lines 0-1 may include a version of data indicated by vertical and horizontal cross shading, and cache lines 2-5 may include a version of data indicated by single diagonal shading.

The buffered page update table 842 may include an entry for LPN2 with a bitmap portion indicating that Cache Line 0 in LPN2 may be modified (indicated by a logical 0) relative to Cache Line 0 in PPN4 and cache lines 1-5 in LPN2 may be unmodified (indicated by logical 1's) relative to cache lines 1-5 in PPN4. Because PPN4 includes a cache line (Cache Line 0) that has been modified relative to LPN2, PPN4 may be considered an invalid page. However, Cache Lines 1-5 in PPN4 may contain valid data because they may include data that is effectively the same as the data in the corresponding unmodified cache lines of LPN2.

The invalid page mapping table 844 may include an entry that may map LPN2 to a physical page PPN2 stored in Chip 2. The physical page PPN2 stored in Chip 2 may include three different versions of data: Cache Line 0 may include a version of data indicated by vertical and horizontal cross shading, Cache Line 1 may include a version of data indicated by dots, and Cache Lines 2-5 may include a version of data indicated by single diagonal shading. Thus, the entry for LPN2 in the invalid page mapping table 844 may include a bitmap portion indicating that Cache Lines 0-1 in PPN2 may be invalid (indicated by logical 0's) because they may include data that may be effectively different from the data in the corresponding modified Cache Lines 0-1 in LPN2. Thus, PPN2 in Chip 2 may be considered an invalid page. The bitmap portion of the entry for LPN2 may also indicate that Cache Lines 2-5 in PPN2 may be valid (indicated by logical 1's) because they may include data that is effectively the same as the data in the corresponding modified Cache Lines 2-5 in LPN2 stored in the data cache 840.

The page LPN2 in the data cache 840 may be considered a dirty page, for example, because it may include a cache line (in this example, Cache Line 0) that has been modified relative to the most recently stored version of the page in PPN4 in Chip 0.

The page LPN2 may be evicted, for example, to make room in the data cache 840 for other pages of data. The page LPN2 may be selected for eviction, for example, based on an LRU policy, a number of unmodified cache lines in the page, and/or the like. For example, in some embodiments, LPN2 may be selected for eviction because it may have a relatively low number of unmodified cache lines.

An eviction operation may include any number of the following operations indicated as operations (1) through (6). The operation numbers are provided for purposes of identifying the operations and do not necessarily indicate an order in which the operations may be performed.

Thus, in some embodiments, the order of the operations may be changed, one or more operations may be omitted, and one or more additional operations may be included. Moreover, although one or more of the operations described with respect to FIGS. 8A and 8B may be described as being performed by the media translation layer 806, in some embodiments, one or more of the operations may be performed by any other apparatus such as a storage device controller, communication interface, NVMe controller, and/or the like.

(1) The media translation layer 806 may select the page of data indicated as LPN2 stored in the data cache 840 for eviction.

(2) The media translation layer 806 may locate the entry for LPN2 in the invalid page mapping table 844 and update the entry to map LPN2 to the invalid physical page PPN4 in Chip 0 as illustrated in FIG. 8B.

(3) The media translation layer 806 may locate the bitmap portion of the entry for LPN2 in the buffered page update table 842 and use it to update the bitmap portion of the entry for LPN2 in the invalid page mapping table 844 as illustrated in FIG. 8B. The updated bitmap portion may indicate that Cache Line 0 in PPN4 may be invalid (indicated by a logical 0) because it may include data that may be effectively different from the data in the corresponding modified Cache Line 0 in LPN2, and Cache Lines 1-5 in PPN4 may be valid (indicated by logical 1's) because they may include data that may be effectively the same as the data in the corresponding unmodified Cache Lines 1-5 in LPN2.

(4) The media translation layer 806 may evict the dirty page LPN2 from the data cache 840 by writing it to a new physical page PPN5 in Chip 3 and removing the entry for LPN2 from the buffered page update table 842 as illustrated in FIG. 8B.

(5) The media translation layer 806 may update the page mapping table 850 to map LPN2 to PPN5 in Chip 3. Thus, LPN2 may no longer be mapped to the physical page PPN2 in Chip 2 as illustrated in FIG. 8B.

(6) The physical page PPN2 in Chip 2 may be marked for erasure and/or garbage collection.

Thus, after the eviction operation illustrated in FIG. 8A and FIG. 8B, the page of data indicated as LPN2 may be removed from the data cache 840, the page mapping table 850 may map LPN2 to a valid version of the page stored in physical page PPN5 in Chip 3, an invalid version of the page may be stored in the physical page PPN4 in Chip 0, and the invalid page mapping table 844 may include an entry mapping LPN2 to invalid page PPN4 and indicating that Cache Line 0 of PPN4 may contain invalid data corresponding to modified Cache Line 0 in PPN5, but Cache Lines 1-5 of PPN4 may include valid data corresponding to unmodified Cache Lines 1-5 in PPN5.

Figure 9:
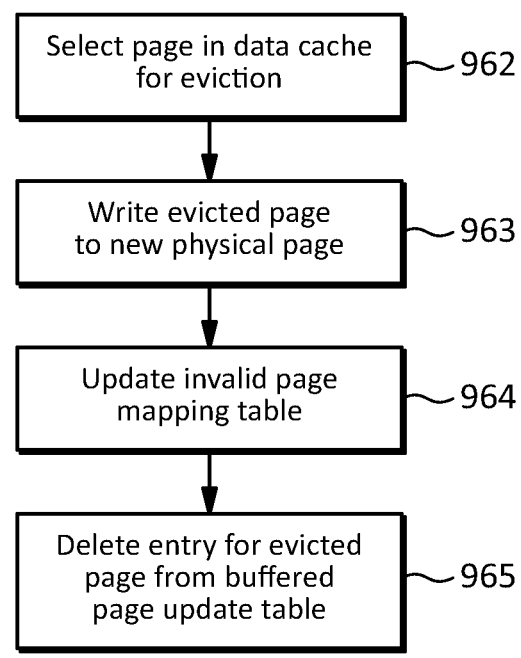
FIG. 9 illustrates an example embodiment of a method for an eviction operation for a memory apparatus operation in accordance with example embodiments of the disclosure.

FIG. 9 illustrates an example embodiment of a method for an eviction operation for a memory apparatus operation in accordance with example embodiments of the disclosure. The embodiment illustrated in FIG. 9 may be implemented, for example, using any of the apparatus disclosed herein including the apparatus illustrated in FIG. 1 through FIG. 6 and FIG. 8 above.

Referring to FIG. 9, the method may begin at operation 962 where the memory apparatus may select a page for eviction from a data cache. The page may be selected, for example, if it has a relatively low number of unmodified cache lines (e.g., the least number of unmodified cache lines) which may indicate that one or more invalid pages corresponding to the selected page may include a relatively small amount of valid data, and thus, may be relatively unlikely to serve as an alternative source of valid data if a corresponding valid page is not readily accessible for a read operation.

At operation 963, the method may write the evicted page to a new physical page in main memory (e.g., nonvolatile memory in a storage device). At operation 964, the method may update an entry for the evicted page in an invalid page mapping table, for example, to map the LPN for the evicted page to a PPN for an invalid version of the page. The entry for the evicted page may also be updated to indicate one or more cache lines in the invalid page that may correspond to unmodified cache lines in the evicted page, and therefore, may include valid data. At operation 965, the method may remove an entry for the evicted page from a buffered page update table.

Figure 10A:
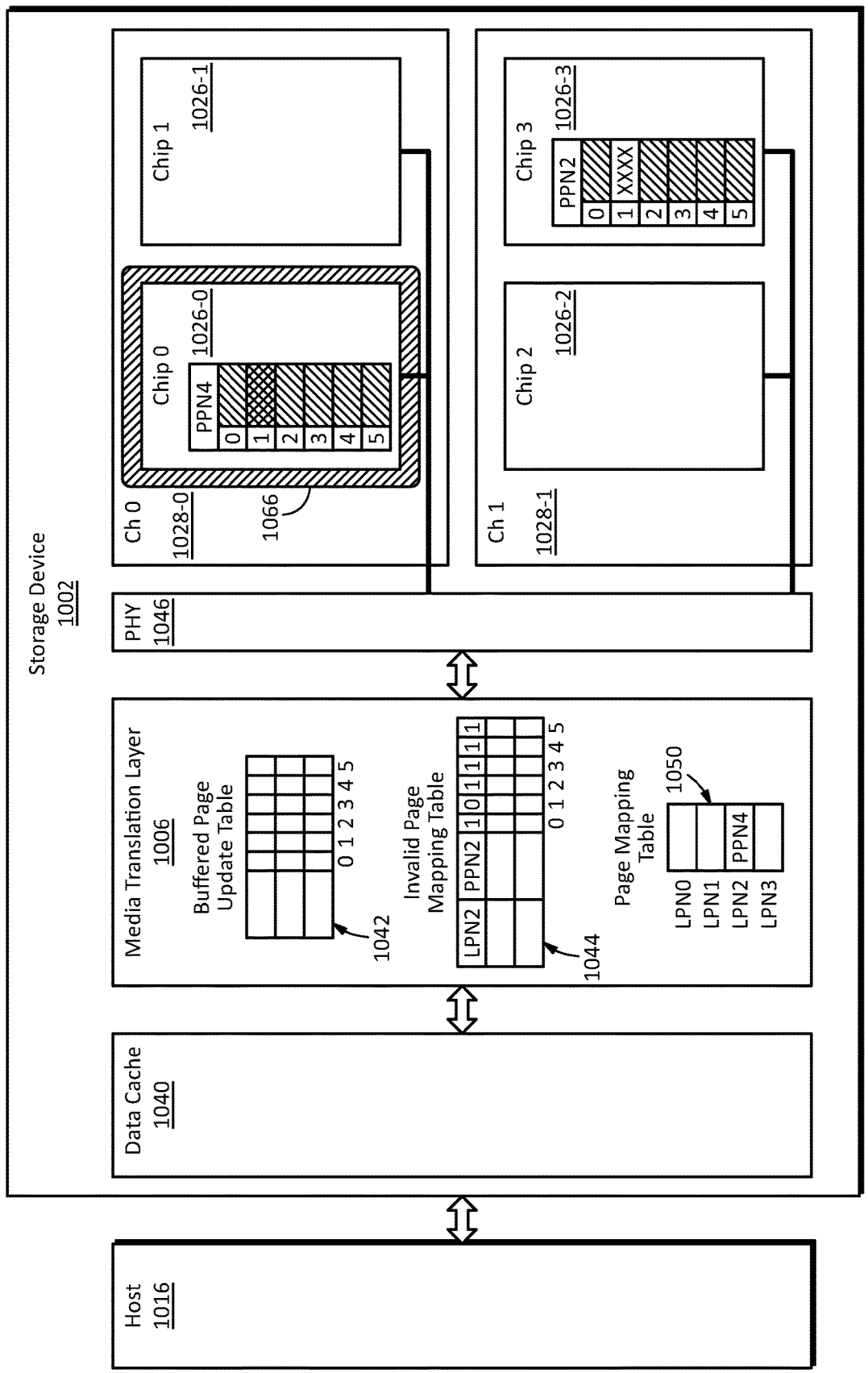
FIG. 10A illustrates an example embodiment of a memory apparatus in a first state relating to a read operation in accordance with example embodiments of the disclosure.
Figure 10B:
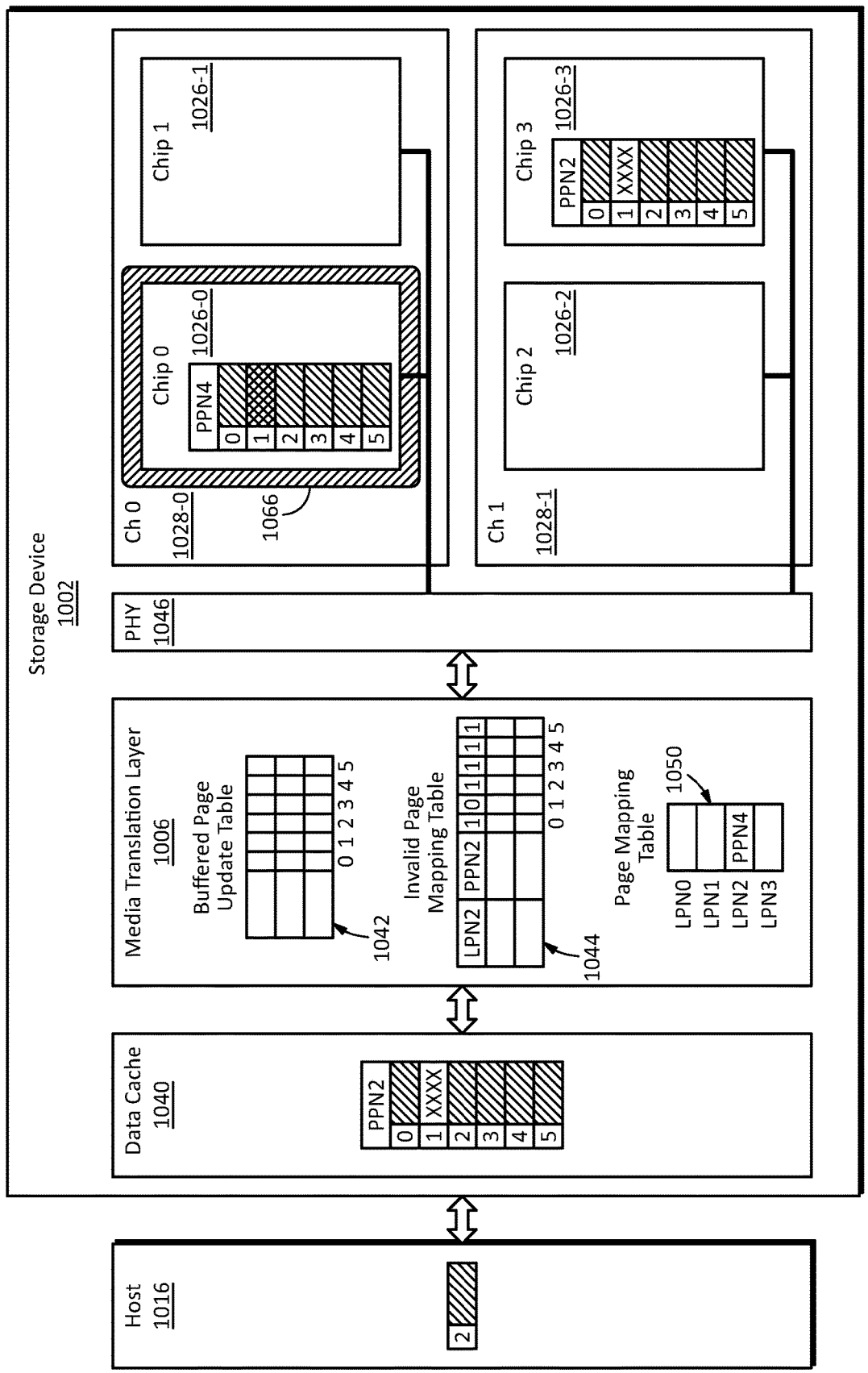
FIG. 10B illustrates the example embodiment of the memory apparatus illustrated in FIG. 10A in a second state relating to a read operation in accordance with example embodiments of the disclosure.

FIG. 10A illustrates an example embodiment of a memory apparatus in a first state relating to a read operation in accordance with example embodiments of the disclosure. FIG. 10B illustrates the example embodiment of the memory apparatus illustrated in FIG. 10A in a second state relating to a read operation in accordance with example embodiments of the disclosure. FIG. 10A and FIG. 10B collectively illustrate a read operation in accordance with example embodiments of the disclosure and may be referred to collectively and/or individually as FIG. 10. The embodiment illustrated in FIG. 10 may be implemented, for example using any of the apparatus disclosed herein including the apparatus illustrated in FIG. 1 through FIG. 6 and/or FIG. 8 above.

In some respects, the embodiment illustrated in FIGS. 10A and 10B may be similar to the embodiment illustrated in FIG. 6A and FIG. 6B, and similar components may be identified with reference designators ending in the same digits. Thus, the embodiment illustrated in FIGS. 10A and 10B may include a host 1016 and a storage device 1002 that may include a data cache 1040, a media translation layer 1006, a physical layer 1046, and one or more memory chips 1026-0 through 1026-3 (indicated as Chip 0 through Chip 3) arranged in one or more channels 1028-0 and 1028-1 (indicated as Ch 0 and Ch 1). The media translation layer 1006 may include a page mapping table 1050, a buffered page update table 1042, and/or an invalid page mapping table 1044 which may be, for example, similar to those described above with respect to FIG. 6A and FIG. 6B.

Moreover, the host 1016 and storage device 1002 may be configured to communicate, for example, using a CXL interface in which the storage device 1002 may be configured to operate, at least partially, in a memory mode (e.g., a CXL cache coherent memory mode) wherein some or all of the storage media in the storage device 1002 may be accessible to the host 1016 as memory (e.g. storage class memory) using the CLX.mem protocol.

FIG. 10A illustrates an initial state of the memory apparatus before a data cache eviction operation. FIG. 10B illustrates a state of the memory apparatus after the data cache eviction operation. Referring to FIG. 10A, the page mapping table 1050 may include an entry that may map a logical page LPN2 to a valid version of the page stored in a physical page PPN4 in Chip 0. The invalid page mapping table 1044 may include an entry that may also map LPN2 to an invalid version of the page stored in a physical page PPN2 in Chip 3.

The bitmap portion of the entry for LPN2 in the invalid page mapping table 1044 may indicate that Cache Lines 0 and 2-5 in PPN2 may include data that may be valid (indicated by logical 1's) because it may be effectively the same as the data in the corresponding unmodified Cache Lines 0 and 2-5 in the valid version of the page stored in PPN4 in Chip 0. The bitmap portion of the entry for LPN2 in the invalid page mapping table 1044 may also indicate that Cache Line 1 in PPN2 may include data that may be invalid (indicated by a logical 0) because it may be effectively different from the data in the corresponding modified Cache Line 1 in the valid version of the page stored in PPN4 in Chip 0. This is illustrated visually in FIG. 8A where the Cache Lines 0 and 2-5 in both PPN2 and PPN4 are shown with a version of data indicated by diagonal shading, Cache Line 1 in PPN4 is shown with a version of data indicated by diagonal cross shading, and Cache Line 1 in PPN2 is shown as invalid indicated by X's.

A write may include any number of the following operations indicated as operations (1) through (8). The operation numbers are provided for purposes of identifying the operations and do not necessarily indicate an order in which the operations may be performed. Thus, in some embodiments, the order of the operations may be changed, one or more operations may be omitted, and one or more additional operations may be included. Moreover, although one or more of the operations described with respect to FIGS. 10A and 10B may be described as being performed by the media translation layer 1006, in some embodiments, one or more of the operations may be performed by any other apparatus such as a storage device controller, communication interface, NVMe controller, and/or the like.

(1) The storage device 1002 may receive a request from the host 1016 to read Cache Line 2 from logical page LPN2. If LPN2 is stored in the data cache 1040, the storage device may read the cache line from LPN2 in the data cache 1040 and send a response to the host 1016 including Cache Line 2 from LPN2.

(3) If LPN2 is not stored in the data cache 1040, the media translation layer 1006 may search the page mapping table 1050 to locate the valid physical page PPN4 in Chip 0 in which LPN2 may be stored.

(4) The media translation layer 1006 may determine that Chip 0, in which PPN4 may be stored, may not be readily accessible, for example, because it may be busy with an ongoing erase and/or garbage collection operation, relatively heavy I/O traffic, and/or the like, as illustrated by bounding box 1066 in FIG. 10A.

(5) The media translation layer 1006 may search the invalid page mapping table 1044 for the entry for LPN2. The entry for LPN2 may indicate that an invalid version of LPN2 may be stored in physical page PPN2 in Chip 3. The bitmap portion of the entry for LPN2 in the invalid page mapping table 1044 may indicate that the invalid version of page LPN2 stored in physical page PPN2 in Chip 3 may include a valid version of Cache Line 2 (indicated by a logical 1 in the bitmap). Cache Line 2 in PPN2 may be valid, for example, because it may correspond to the unmodified Cache Line 2 in the valid version of LPN2 stored in PPN4 in Chip 0.

(6) The media translation layer 1006 may determine that Chip 3 is more readily accessible than Chip 0 (e.g., because Chip 3 may not be undergoing an erase and/or garbage collection operation, may not be busy with relatively heavy I/O operations, and/or the like).

(7) Because the invalid version of page LPN2 stored in physical page PPN2 in Chip 3 may include a valid version of the requested Cache Line 2, and Chip 3 may be more readily accessible than Chip 0, the media translation layer 1006 may read the invalid version of page LPN2 stored in physical page PPN2 stored in Chip 3 and load it into the data cache 1040 as illustrated in FIG. 10B.

(8) The storage device 1002 may read the valid data in Cache Line 2 of LPN2 stored in the data cache 1040 and send it to the host 1016 in a response to the read request as shown in FIG. 10B.

Depending on the implementation details, reading a valid cache line from an invalid version of a page of data opportunistically as described above with respect to FIG. 10A and FIG. 10B may reduce the latency and/or power consumption associated with reading data from a relatively inaccessible page. Moreover, it may enable the cache line to be read without suspending an erase operation which may reduce latency for other processes that may access the chip that is being erased. Further, depending on the implementation details, the techniques disclosed herein may have little or no impact on the durability, reliability, lifetime, and/or the like, of a storage device in which it may be implemented.

Figure 11:
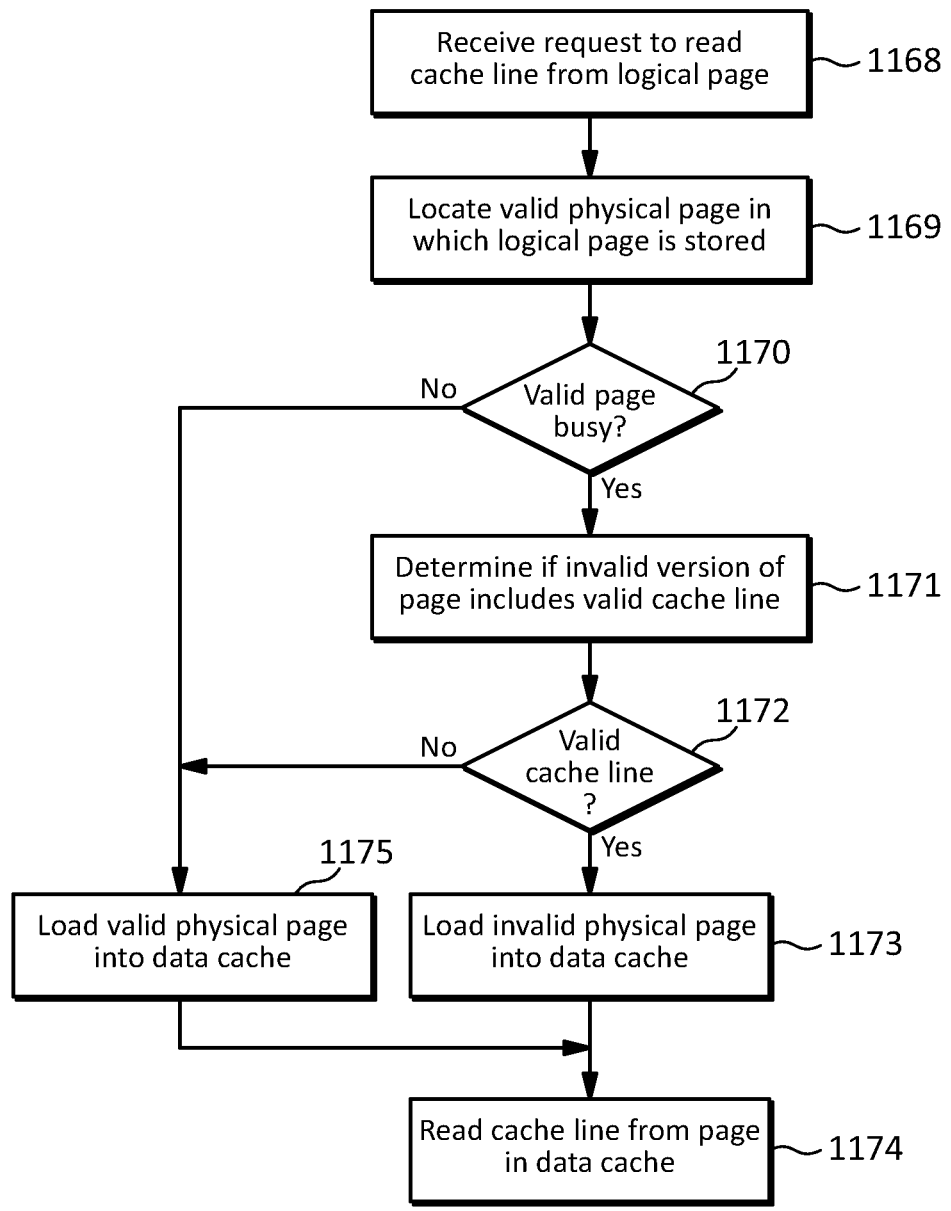
FIG. 11 illustrates an example embodiment of a method for a read operation for a memory apparatus operation in accordance with example embodiments of the disclosure.

FIG. 11 illustrates an example embodiment of a method for a read operation for a memory apparatus operation in accordance with example embodiments of the disclosure. The embodiment illustrated in FIG. 11 may be implemented, for example, using any of the apparatus disclosed herein including the apparatus illustrated in FIG. 1 through FIG. 6, FIG. 8, and/or FIG. 10 above.

Referring to FIG. 11, the method may begin at operation 1168 where the memory apparatus may receive a read request to read a cache line from a logical page of data. At operation 1169, the method may locate the valid physical page in which the requested cache line may be stored, for example, using a page mapping table. At operation 1170, the method may determine if the valid physical page in which the requested cache line is stored is busy, for example, with an erase operation, other I/O traffic, and/or the like. If the valid page is located on a chip that is not being erased, and the valid page and/or chip on which it is located is not busy with relatively high I/O traffic, the method may load the valid page into a data cache at operation 1175 and proceed to operation 1174.

If, however, at operation 1170, the method determines that a chip on which the valid physical page is located is being erased, or that the valid page and/or chip on which it is located is busy with relatively high I/O traffic, the method may attempt to avoid the page undergoing erasure and/or may attempt to implement load balancing by attempting to read the requested cache line from an invalid page that may include a valid version of the requested cache line. Thus, the method may proceed to operation 1171 where it may determine if an invalid version of the logical page includes a valid version of the requested cache line. If, at operation 1172, the method is unable to locate a valid version of the requested cache line in an invalid version of the page, the method may load the valid page into the data cache at operation 1175 and proceed to operation 1174. If, however, at operation 1172, the method is able to locate a valid version of the requested cache line in an invalid version of the page, the method may load the invalid page into the data cache at operation 1173 and proceed to operation 1174.

At operation 1174, the method may read the requested cache line from the page in the data cache. The memory apparatus may send the cache line with a response to the read request.

Figure 12A:
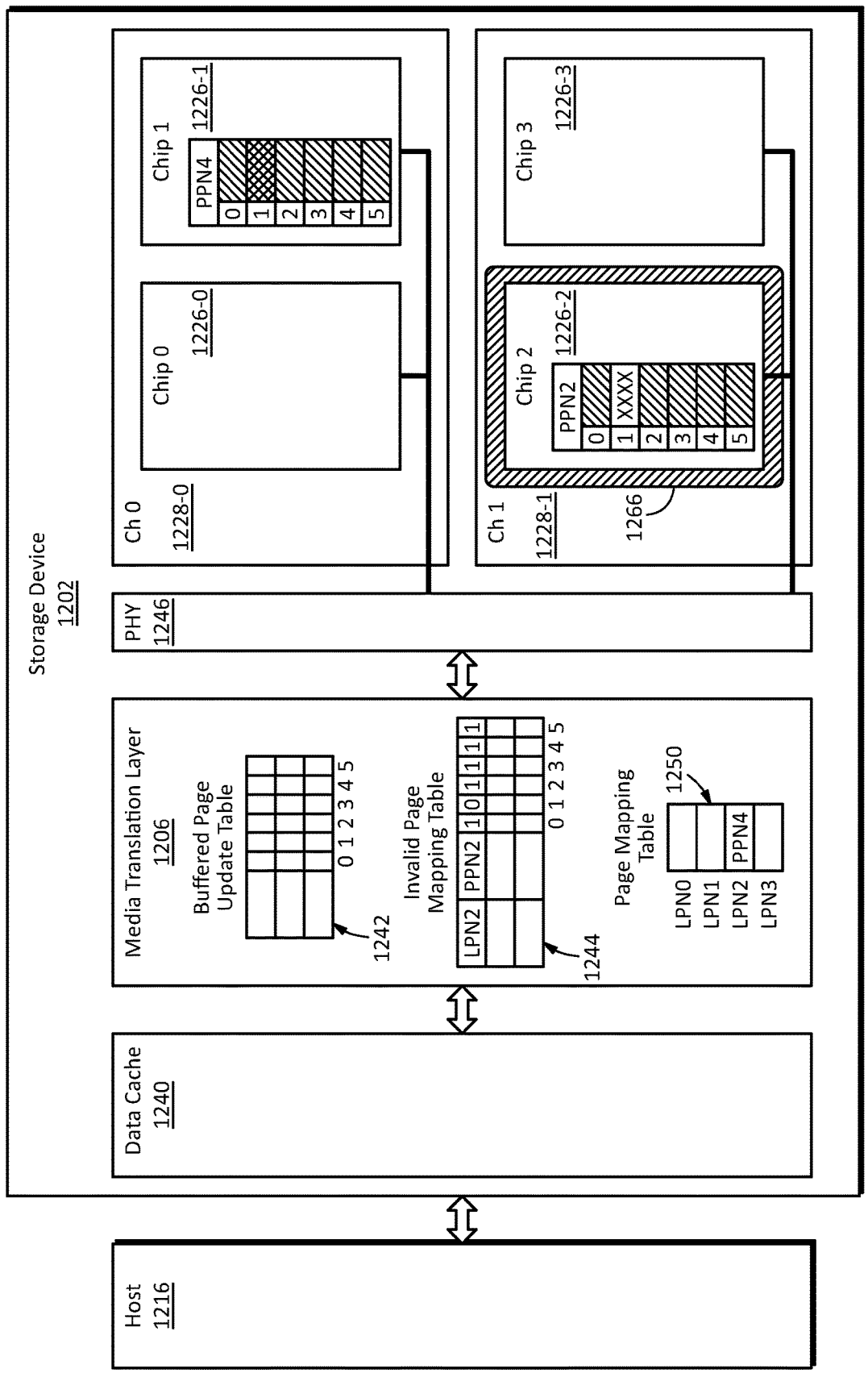
FIG. 12A illustrates an example embodiment of a memory apparatus in a first state relating to a garbage collection operation in accordance with example embodiments of the disclosure.
Figure 12B:
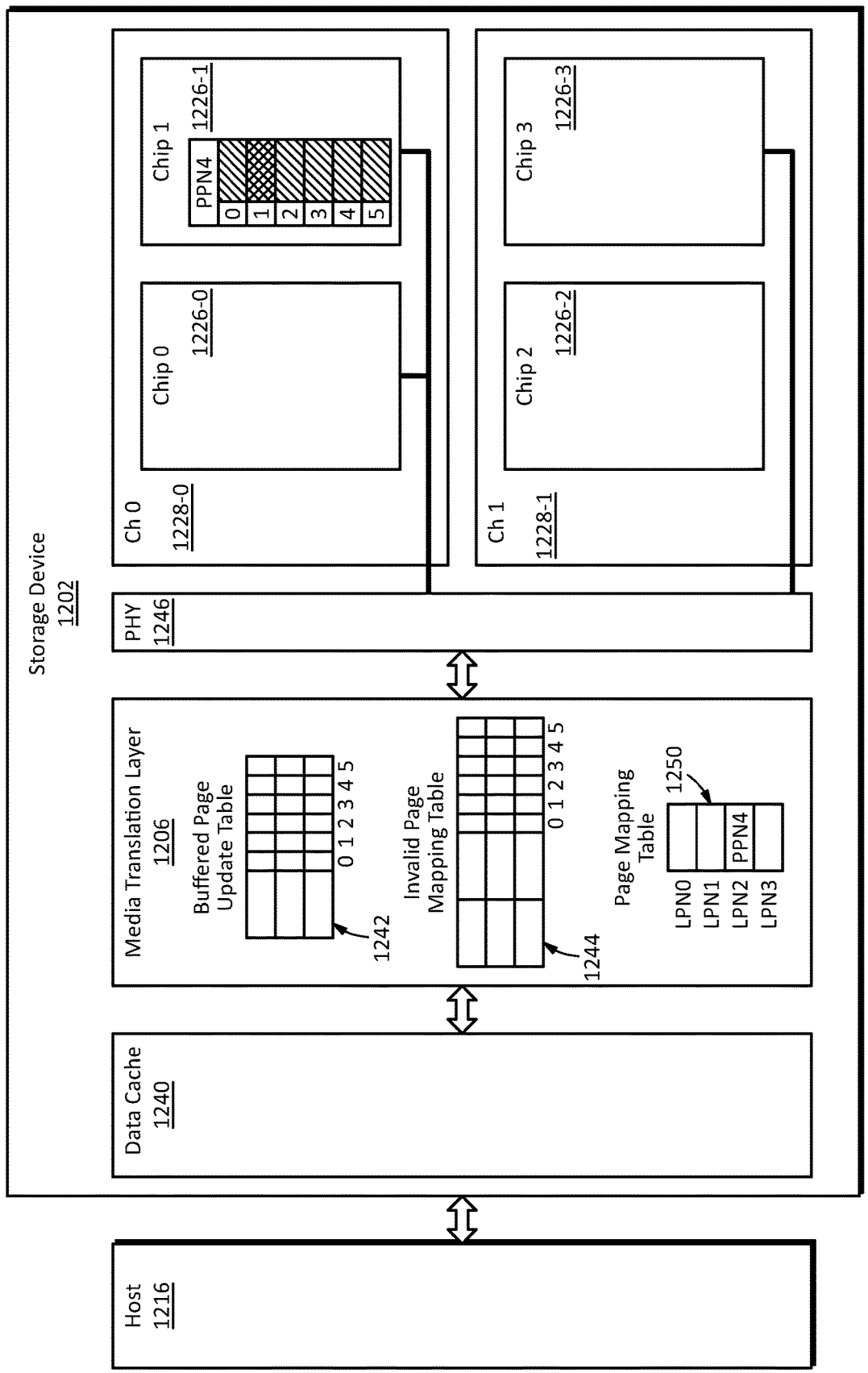
FIG. 12B illustrates the example embodiment of the memory apparatus illustrated in FIG. 12A in a second state relating to a garbage collection operation in accordance with example embodiments of the disclosure.

FIG. 12A illustrates an example embodiment of a memory apparatus in a first state relating to a garbage collection operation in accordance with example embodiments of the disclosure. FIG. 12B illustrates the example embodiment of the memory apparatus illustrated in FIG. 12A in a second state relating to a garbage collection operation in accordance with example embodiments of the disclosure. FIG. 12A and FIG. 12B collectively illustrate a garbage collection operation in accordance with example embodiments of the disclosure and may be referred to collectively and/or individually as FIG. 12. The embodiment illustrated in FIG. 12 may be implemented, for example using any of the apparatus disclosed herein including the apparatus illustrated in FIG. 1 through FIG. 6, FIG. 8, and/or FIG. 10 above.

In some respects, the embodiment illustrated in FIGS. 12A and 12B may be similar to the embodiment illustrated in FIG. 6A and FIG. 6B, and similar components may be identified with reference designators ending in the same digits. Thus, the embodiment illustrated in FIGS. 12A and 12B may include a host 1216 and a storage device 1202 that may include a data cache 1240, a media translation layer 1206, a physical layer 1246, and one or more memory chips 1226-0 through 1226-3 (indicated as Chip 0 through Chip 3) arranged in one or more channels 1228-0 and 1228-1 (indicated as Ch 0 and Ch 1). The media translation layer 1206 may include a page mapping table 1250, a buffered page update table 1242, and/or an invalid page mapping table 1244 which may be, for example, similar to those described above with respect to FIG. 6A and FIG. 6B. Moreover, the host 1216 and storage device 1202 may be configured to communicate, for example, using a CXL interface in which the storage device 1202 may be configured to operate, at least partially, in a memory mode (e.g., a CXL cache coherent memory mode) wherein some or all of the storage media in the storage device 1202 may be accessible to the host 1216 as memory (e.g. storage class memory) using the CLX.mem protocol.

FIG. 12A illustrates an initial state of the memory apparatus before a garbage collection operation. FIG. 12B illustrates the state of the memory apparatus after the garbage collection operation. Referring to FIG. 12A, the page mapping table 1250 may include an entry for LPN2 that may map a logical page LPN2 to a valid physical page PPN4 stored in Chip 1. The Invalid page mapping table 1244 may also map the logical page LPN2 to an invalid physical page PPN2 stored in Chip 2.

In some embodiments, if any valid pages are stored in Chip 2, the storage device may initiate a garbage collection operation by moving the valid pages to a different chip. After moving any valid pages, the storage device 1202 may initiate an erase operation on Chip 2 as illustrated by the bounding box 1266. Thus, the invalid page PPN2 may be erased from Chip 2 as shown in FIG. 12B. The media translation layer may remove the entry for PPN2 from the invalid page mapping table 1244 as shown in FIG. 12B.

Figure 13:
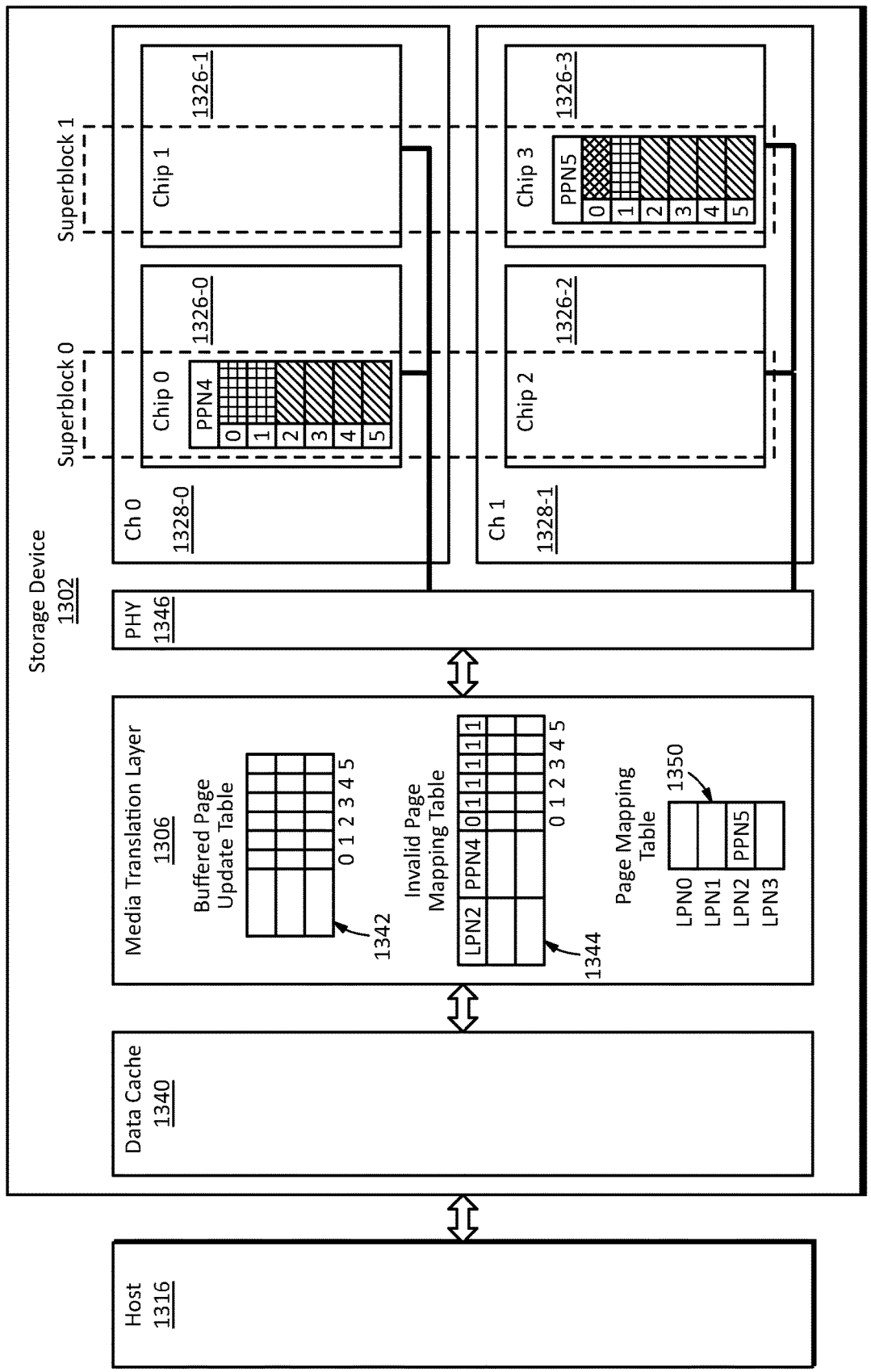
FIG. 13 illustrates an example embodiment of a memory apparatus having pages arranged in superblocks in accordance with example embodiments of the disclosure.

FIG. 13 illustrates an example embodiment of a memory apparatus having pages arranged in superblocks in accordance with example embodiments of the disclosure. In some respects, the embodiment illustrated in FIG. 13 may be similar to the embodiment illustrated in FIG. 8B, and similar components may be identified with reference designators ending in the same digits. However, in the embodiment illustrated in FIG. 13, pages in the Chip 0 through Chip 3 may be arranged in superblocks indicated as Superblock 0 and Superblock 1. The physical page PPN4 stored in Chip 0 (which may be part of Superblock 0) may have been the latest version of page LPN2 written to nonvolatile memory before the eviction of LPN2 from the data cache 1340. When LPN2 is evicted from the data cache 1340, writing the new valid page to physical page PPN5 in a different superblock on a different chip (e.g., Chip 3 in Superblock 1) compared to the latest invalid page may prevent an ongoing erase operation on a superblock from blocking accesses to one or more chips belonging to that superblock. Depending on the implementation details, this may avoid or eliminate delays caused by waiting for an erase operation when reading a valid cache line from an invalid page.

Any of the functionality described herein, including any of the host functionality, memory apparatus functionally, and/or the like (e.g., controllers, tracking logic, cache line tracking, and/or the like) may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as ARM processors), graphics processing units (GPUs), neural processing units (NPUs), tensor processing units (TPUs) and/or the like, executing instructions stored in any type of memory. In some embodiments, one or more components may be implemented as a system-on-chip (SOC).

Figure 14:
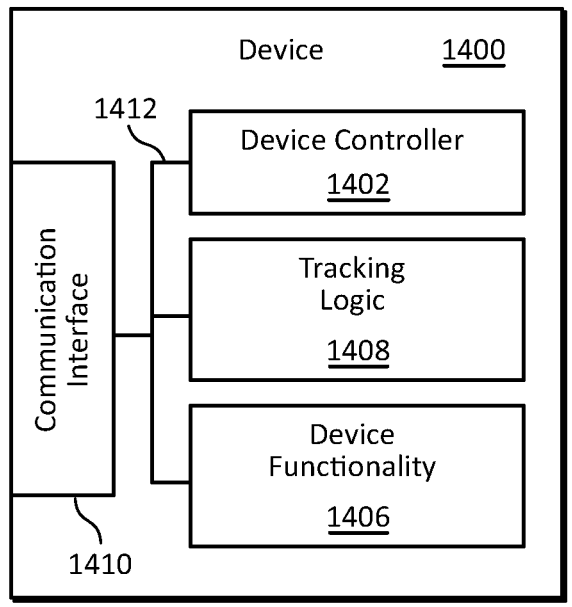
FIG. 14 illustrates an example embodiment of a device in accordance with example embodiments of the disclosure.

FIG. 14 illustrates an example embodiment of a device in accordance with example embodiments of the disclosure. The embodiment 1400 illustrated in FIG. 14 may be used, for example, to implement any of the memory apparatus disclosed herein. The device 1400 may include a device controller 1402, tracking logic 1408, a device functionality circuit 1406, and/or a communication interface 1410. The components illustrated in FIG. 14 may communicate through one or more device buses 1412. The tracking logic 1408 may be used, for example, to implement any of the invalid page tracking functionality disclosed herein.

The device functionality circuit 1406 may include any hardware to implement the primary function of the device 1400. For example, if the device 1400 is implemented as a storage device, the device functionality circuit 1406 may include a storage medium such as one or more flash memory devices, an FTL, and/or the like. As another example, if the device 1400 is implemented as a network interface card (NIC), the device functionality circuit 1406 may include one or more modems, network interfaces, physical layers (PHYs), medium access control layers (MACs), and/or the like. As a further example, if the device 1400 is implemented as an accelerator, the device functionality circuit 1406 may include one or more accelerator circuits, memory circuits, and/or the like.

Figure 15:
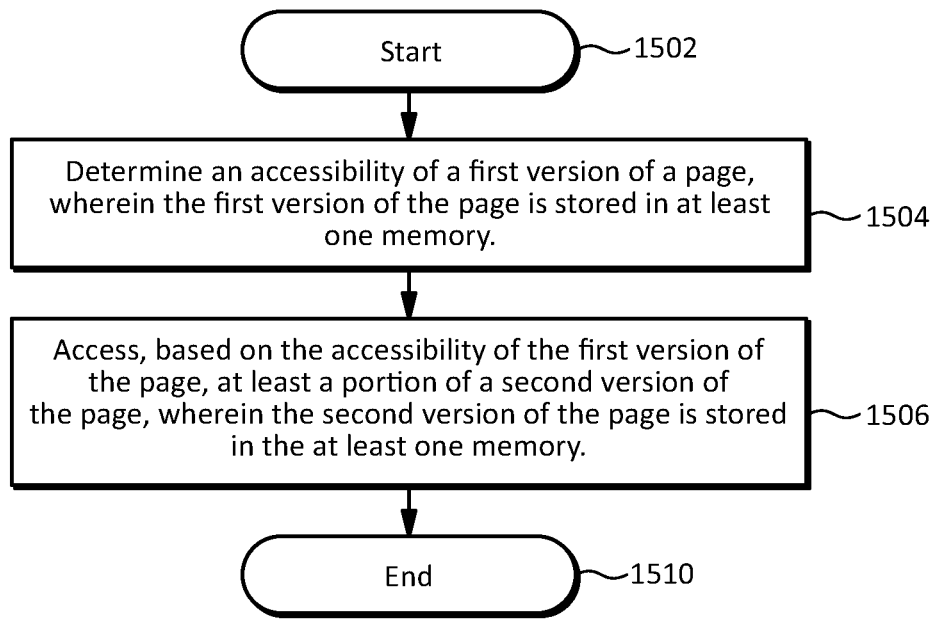
FIG. 15 illustrates an embodiment of a method for accessing a version of a page in accordance with example embodiments of the disclosure.

FIG. 15 illustrates an embodiment of a method for accessing a version of a page in accordance with example embodiments of the disclosure. The method may begin at operation 1502. At operation 1504, the method may determine an accessibility of a first version of a page, wherein the first version of the page is stored in at least one memory. The accessibility of the first version of the page may be based, for example, on an erase operation of the first page, an amount of accesses of the first page, an amount of access of a second version of the page, and/or the like. At operation 1506, the method may access, based on the accessibility of the first version of the page, at least a portion of a second version of the page, wherein the second version of the page is stored in the at least one memory. The at least a portion of the second version of the page may include, for example, a cache line. The method may end at operation 1508.

The embodiment illustrated in FIG. 15, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
  determining an accessibility of a first version of a page, wherein the first version of the page is stored in at least one memory; and
  accessing, based on the accessibility of the first version of the page, at least a portion of a second version of the page, wherein the second version of the page is stored in the at least one memory, wherein a part of the first version of the page is the same as a part of the second version of the page and a bitmap data structure is used to determine that the part of the first version of the page and the part of the second version are the same, the bitmap data structure indicating a status of one or more cache lines of the second version of the page and one or more cache lines of the first version of the page.

2. The method of claim 1, further comprising determining a modification status of a portion of the first version of the page, wherein the accessing the at least a portion of the second version of the page comprises accessing a portion of the second version of the page corresponding to the portion of the first version of the page.

3. An apparatus comprising:
  at least one memory; and
  at least one processor configured to:
    determine an accessibility of a first version of a page, wherein the first version of the page is stored in the at least one memory; and
    perform, based on the accessibility of the first version of the page, an access of at least a portion of a second version of the page, wherein the second version of the page is stored in the at least one memory, wherein a part of the first version of the page is the same as a part of the second version of the page and a bitmap data structure is used to determine that the part of the first version of the page and the part of the second version are the same, the bitmap data structure indicating a status of one or more cache lines of the second version of the page and one or more cache lines of the first version of the page.

4. The apparatus of claim 3, wherein the accessibility of the first version of the page is based on an erase operation of the first version of the page.

5. The apparatus of claim 3, wherein the accessibility of the first version of the page is based on an amount of accesses of the first version of the page.

6. The apparatus of claim 5, wherein the accessibility of the first version of the page is further based on an amount of accesses of the second version of the page.

7. The apparatus of claim 3, wherein the access of the at least a portion of the second version of the page comprises an access of a cache line of the second version of the page.

8. The apparatus of claim 3, wherein the access of the at least a portion of the second version of the page is based on a modification status of the first version of the page.

9. The apparatus of claim 8, wherein:
the access of the at least a portion of the second version of the page comprises an access of a portion of the second version of the page; and
the modification status of the first version of the page is based on a modification status of a portion of the first version of the page corresponding to the portion of the second version of the page.

10. The apparatus of claim 9, wherein:
the portion of the first version of the page comprises a cache line of the first version of the page; and
the portion of the second version of the page comprises a cache line of the second version of the page corresponding to the cache line of the first version of the page.

11. The apparatus of claim 3, wherein the at least one processor is configured to track a modification status of the at least a portion of the second version of the page.

12. The apparatus of claim 3, wherein the access of the at least a portion of the second version of the page comprises a read operation.

13. The apparatus of claim 3, wherein the at least one processor is configured to:
store, in a first superblock, the first version of the page; and
store, in a second superblock, the second version of the page.

14. The apparatus of claim 3, further comprising a cache configured to store the first version of the page, wherein the at least one processor is configured to track a modification status of the first version of the page.

15. The apparatus of claim 14, wherein the at least one processor is configured to evict the first version of the page based on the modification status of the first version of the page.

16. The apparatus of claim 3, wherein:
the apparatus comprises a storage device; and
the at least one memory comprises at least one storage media.

17. The apparatus of claim 16, wherein the storage device is configured to operate in a coherent memory mode.

18. An apparatus comprising:
at least one memory; and
at least one processor configured to:
store a first version of a page in at least one memory;
store a second version of the page in the at least one memory; and
track a modification status of at least a portion of the first version of the page, wherein a part of the first version of the page is the same as a part of the second version of the page and a bitmap data structure is used to determine that the part of the first version of the page and the part of the second version are the same, the bitmap data structure indicating a status of one or more cache lines of the second version of the page and one or more cache lines of the first version of the page.

19. The apparatus of claim 18, wherein the modification status of the at least a portion of the first version of the page comprises a modification status of a portion of the first version of the page.

20. The apparatus of claim 19, wherein the portion of the first version of the page comprises a cache line.

* * * * *